(12) United States Patent
Zhu

(10) Patent No.: US 11,496,281 B2
(45) Date of Patent: Nov. 8, 2022

(54) METHOD AND DEVICE FOR INDICATING TRANSMISSION DIRECTION

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 167 days.

(21) Appl. No.: 16/633,127

(22) PCT Filed: Jul. 31, 2017

(86) PCT No.: PCT/CN2017/095264
§ 371 (c)(1),
(2) Date: Jan. 22, 2020

(87) PCT Pub. No.: WO2019/023880
PCT Pub. Date: Feb. 7, 2019

(65) Prior Publication Data
US 2020/0153601 A1 May 14, 2020

(51) Int. Cl.
*H04L 5/18* (2006.01)
*H04B 17/21* (2015.01)
(Continued)

(52) U.S. Cl.
CPC .............. *H04L 5/18* (2013.01); *H04B 17/21* (2015.01); *H04B 17/27* (2015.01); *H04L 1/0025* (2013.01);
(Continued)

(58) Field of Classification Search
None
See application file for complete search history.

(56) References Cited

U.S. PATENT DOCUMENTS 9,722,760 B2     8/2017   Stern-Berkowitz et al.
10,813,100 B2 *  10/2020  Chen ................... H04W 72/04
(Continued)

FOREIGN PATENT DOCUMENTS

CN    104105203 A    10/2014
CN    104854811 A    8/2015
EP    2 840 851 A1   2/2015

OTHER PUBLICATIONS

Supplementary European Search Report in European Application No. 17920407.8, dated Dec. 17, 2020.
(Continued)

*Primary Examiner* — Bob A Phunkulh
(74) *Attorney, Agent, or Firm* — Finnegan, Henderson, Farabow, Garrett & Dunner, L.L.P.

(57) ABSTRACT

A method and device for indicating a transmission direction are provided. The method includes: determining a detection mode for detecting a transmission direction of each of the at least one bandwidth part; detecting transmission direction indication information about a bandwidth part according to the detection mode; and determining the transmission direction of the bandwidth part according to the detected transmission direction indication information. In the present disclosure, a terminal can accurately know a transmission direction of each bandwidth part, thereby reducing the detection cost of the terminal.

19 Claims, 11 Drawing Sheets

(51) Int. Cl.
*H04B 17/27* (2015.01)
*H04L 1/00* (2006.01)
*H04W 28/20* (2009.01)
*H04W 72/04* (2009.01)
*H04W 72/12* (2009.01)

(52) U.S. Cl.
CPC ......... *H04W 28/20* (2013.01); *H04W 72/042* (2013.01); *H04W 72/0453* (2013.01); *H04W 72/1289* (2013.01)

(56) References Cited

U.S. PATENT DOCUMENTS

| | | | |
|---|---|---|---|
| 2014/0086112 A1 | 3/2014 | Stern-Berkowitz et al. | |
| 2014/0307593 A1* | 10/2014 | Zhao | H04L 5/001 370/278 |
| 2014/0334351 A1* | 11/2014 | Yin | H04L 5/0091 370/280 |
| 2015/0055523 A1 | 2/2015 | Lei et al. | |
| 2015/0237626 A1* | 8/2015 | Li | H04L 5/14 370/280 |
| 2015/0372798 A1* | 12/2015 | Zhao | H04B 7/2656 370/280 |
| 2016/0066282 A1* | 3/2016 | Ouchi | H04L 5/00 455/522 |
| 2016/0081110 A1* | 3/2016 | Suzuki | H04L 5/0094 370/336 |
| 2017/0331611 A1 | 11/2017 | Stern-Berkowitz et al. | |
| 2017/0332376 A1* | 11/2017 | He | H04W 52/00 |
| 2018/0302197 A1* | 10/2018 | He | H04W 72/046 |

OTHER PUBLICATIONS

Zte et al., "Discussion on dynamic TDD operations", 3GPP TSG RAN WG1 Meeting #87, R1-1612158, Reno, USA, Nov. 14-18, 2016, 3 pages.
Vivo, "Proposal on the slot based dynamic TDD", 3GPP TSG RAN WG1 AH_NR Meeting, R1-1700283, Spokane, USA, Jan. 16-20, 2017, 9 pages.
NTT Docomo, Inc., "Mechanisms for dynamic TDD", 3GPP TSG RAN WG1 Meeting #86bis, R1-1610085, Lisbon, Portugal, Oct. 10-14, 2016, 5 pages.
International Search Report in the International Application No. PCT/CN2017/095264, dated Apr. 18, 2018.
English version of the Written Opinion of the International Search Authority in the International Application No. PCT/CN2017/095264, dated Apr. 18, 2018.

* cited by examiner

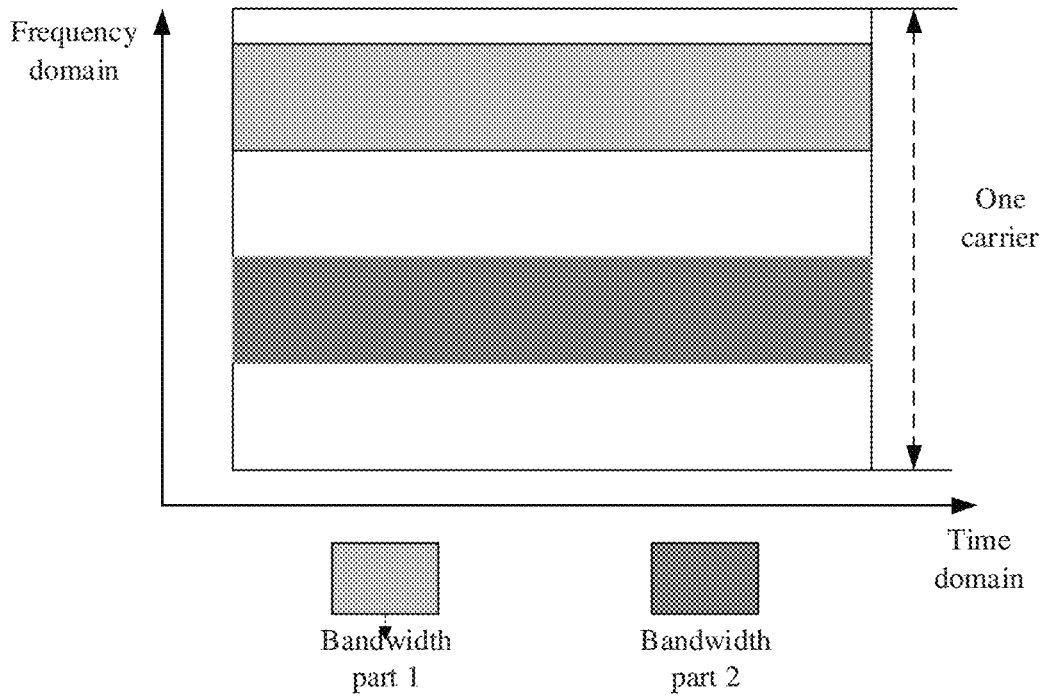

FIG. 1C

```
┌─────────────────────────────────────────────────────────────┐
│ A signaling notification sent by the base station through   │
│ target signaling for instructing the terminal to detect a   │──210
│ transmission direction of each bandwidth part is received,  │
│ the signaling notification including configuration          │
│ information transmitted by the transmission direction       │
│ indication information about each bandwidth part            │
└─────────────────────────────────────────────────────────────┘
                              ▼
┌─────────────────────────────────────────────────────────────┐
│ A detection position corresponding to each bandwidth part   │──220
│ is determined according to the configuration information    │
│ transmitted by the transmission direction indication        │
│ information about each bandwidth part                       │
└─────────────────────────────────────────────────────────────┘
                              ▼
┌─────────────────────────────────────────────────────────────┐
│ Transmission direction indication information about a       │──230
│ corresponding bandwidth is detected at the determined       │
│ detection position corresponding to each bandwidth part     │
└─────────────────────────────────────────────────────────────┘
                              ▼
┌─────────────────────────────────────────────────────────────┐
│ The transmission direction of the corresponding bandwidth   │──240
│ part is determined according to the detected transmission   │
│ direction indication information                            │
└─────────────────────────────────────────────────────────────┘
```

FIG. 2A

METHOD AND DEVICE FOR INDICATING TRANSMISSION DIRECTION

CROSS REFERENCE TO RELATED APPLICATIONS

This application is a national phase application based on PCT/CN2017/095264, filed Jul. 31, 2017, the content of which is incorporated herein by reference.

TECHNICAL FIELD

The present disclosure relates to the field of communications, and more particularly, to a method and device for indicating a transmission direction.

BACKGROUND

In a Long Term Evolution (LTE) system, there are two operating modes: Frequency Division Duplexing (FDD) and Time Division Duplexing (TDD). For the FDD mode, uplink and downlink transmissions are implemented on different carriers. For the TDD mode, uplink and downlink transmissions are implemented on the same carrier. Moreover, in the design of an LTE system, uplink and downlink transmission directions of a terminal are predefined, and it is impossible to completely and dynamically change the uplink and downlink transmission directions of the terminal.

In a new generation communication system, the uplink and downlink transmission directions of a terminal may be dynamically changed. Therefore, if the terminal does not know its transmission direction in time, it will bring greater detection complexity to itself and also cause greater power consumption.

SUMMARY

To overcome the problems in the related art, the embodiments of the present disclosure provide a method and device for indicating a transmission direction.

According to a first aspect of the embodiments of the present disclosure, a method for indicating a transmission direction is provided. The method may be applied to a terminal. A base station may configure at least one bandwidth part for the terminal. The method may include that:

a detection mode for detecting a transmission direction of each of the at least one bandwidth part is determined;

transmission direction indication information about a bandwidth part is detected according to the detection mode; and a transmission direction of the bandwidth is determined according to the detected transmission direction indication information.

Optionally, the operation that a detection mode for detecting a transmission direction of each of the at least one bandwidth part is determined may include that:

a first signaling notification that is sent by the base station through target signaling to instruct the terminal to detect a transmission direction of each bandwidth part is received; and a detection triode for detecting the transmission direction of each of the at least one bandwidth part is determined according to the first signaling notification.

Optionally, the first signaling notification may include first information, second information and third information;

the first information may include information about one or more designated bandwidth parts, each of the one or more designated bandwidth parts being one designated from all configured bandwidth parts;

the second information may include a pairing relationship corresponding to each of the one or more designated bandwidth parts, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part;

the third information may include configuration information transmitted by the transmission direction indication information about each of the one or more designated bandwidth parts;

the operation that a detection mode for detecting the transmission direction of each of the at least one bandwidth part is determined according to the first signaling notification may include that:

a bandwidth part to be detected is determined as one or more designated bandwidth parts according to the first information;

the pairing relationship corresponding to each of the one or more designated bandwidth parts is determined according to the second information; and a detection position corresponding to each of one or more designated bandwidth parts is determined according to the third information.

Optionally, the operation that transmission direction indication information about a bandwidth part is detected according to the detection mode may include that:

transmission direction indication information about each of the one or more designated bandwidth parts is detected, the transmission direction indication information about the designated bandwidth part carrying information about a transmission direction of one or more indicated bandwidth parts;

the operation that the transmission direction of the bandwidth part is determined according to the detected transmission direction indication information may include that:

the transmission direction of one or more indicated bandwidth parts indicated in the transmission direction indication information about each of the one or more designated bandwidth parts is determined as the transmission direction of each of the one or more indicated bandwidth parts according to the pairing relationship.

Optionally, the operation that a detection mode for detecting a transmission direction of each of all the configured bandwidth parts is determined may include that:

a bandwidth part to be detected is determined as all configured bandwidth parts;

a transmission direction indicated in the transmission direction indication information about each of all the configured bandwidth parts is determined as a transmission direction of the bandwidth part; and a detection position corresponding to each of all the configured bandwidth parts is determined.

Optionally, the operation that a detection position corresponding to each of the at least one bandwidth part is determined may include that:

a second signaling notification sent by the base station through target signaling is received, the second signaling notification including configuration information transmitted by transmission direction indication information about each of all the configured bandwidth parts; and the detection position corresponding to each of all the configured bandwidth parts is determined according to the second signaling notification.

Optionally, the operation that transmission direction indication information about a bandwidth part is detected according to the detection mode may include that:

the transmission direction indication information about each of all the configured bandwidth parts is detected, the transmission direction indication information carrying information about a transmission direction of the bandwidth part;

the operation that the transmission direction of the corresponding bandwidth part is determined according to the detected transmission direction indication information may include that:

a transmission direction indicated in the transmission direction indication information about each of all the configured bandwidth parts is determined as the transmission direction of the bandwidth part.

Optionally, the operation that a detection mode for detecting a transmission direction of each of the at least one bandwidth part is determined may include that:

a bandwidth part to be detected is determined as one or more designated bandwidth parts, each of the one or more designated bandwidth parts being one designated from all configured bandwidth parts;

a pairing relationship corresponding to each of the one or more designated bandwidth parts is determined, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part; and a detection position corresponding to each of one or more designated bandwidth parts is determined.

Optionally, the method may further include the following steps:

a third signaling notification sent by the base station through target signaling is received, the third signaling notification including the one or more designated bandwidth parts and including the pairing relationship corresponding to each of the one or more designated bandwidth parts.

Optionally, the operation that a detection position corresponding to each of one or more designated bandwidth parts is determined may include that:

a fourth signaling notification sent by the base station through target signaling is received, the fourth signaling notification including configuration information transmitted by transmission direction indication information about each of the one or more designated bandwidth parts; and the detection position corresponding to each of one or more designated bandwidth parts is determined according to the fourth signaling notification, Optionally, the operation that transmission direction indication information about a bandwidth part is detected according to the detection mode may include that:

transmission direction indication information about each of the one or more designated bandwidth parts is detected, the transmission direction indication information about the designated bandwidth part carrying information about a transmission direction of one or more indicated bandwidth parts;

the operation that the transmission direction of the bandwidth part is determined according to the detected transmission direction indication information may include that:

the transmission direction of one or more indicated bandwidth parts indicated in the transmission direction indication information about each of the one or more designated bandwidth parts is determined as the transmission direction of each of the one or more indicated bandwidth parts according to the pairing relationship.

Optionally, the operation that a detection mode for detecting a transmission direction of each of the at least one bandwidth part is determined may include that:

a bandwidth part to be detected is determined as one or more designated bandwidth parts, each of the one or more designated bandwidth parts being one designated from all configured bandwidth parts;

a transmission direction indicated in the transmission direction indication information about each of the one or more designated bandwidth parts is determined as a transmission direction of the bandwidth part; and a detection position corresponding to each of one or more designated bandwidth parts is determined.

Optionally, the method may further include that:

a fifth signaling notification sent by the base station through target signaling is received, the fifth signaling notification including the one or more designated bandwidth parts.

Optionally, the operation that a detection position corresponding to each of one or more designated bandwidth parts is determined may include that:

a sixth signaling notification sent by the base station through target signaling is received, the sixth signaling notification including configuration information transmitted by the transmission direction indication information about each of the one or more designated bandwidth parts; and the detection position corresponding to each of one or more designated bandwidth parts is determined according to the sixth signaling notification.

Optionally, the operation that transmission direction indication information about a bandwidth part is detected according to the detection mode may include that:

transmission direction indication information about each of the one or more designated bandwidth parts is detected, the transmission direction indication information carrying information about a transmission direction of the designated bandwidth part;

the operation that the transmission direction of the bandwidth part is determined according to the detected transmission direction indication information may include that:

a transmission direction indicated in the transmission direction indication information about each of the one or more designated bandwidth parts is determined as a transmission direction of the designated bandwidth part; and a transmission direction of any other bandwidth part that is not designated to be detected is obtained from the transmission direction of the designated bandwidth part according to a predefined rule, the predefined rule including a rule of determining a transmission direction of any other bandwidth part that is not designated to be detected according to the transmission direction of the designated bandwidth part.

Optionally, the method may further include that:

a sixth signaling notification sent by the base station through target signaling is received, the sixth signaling notification including the predefined rule.

Optionally, the target signaling may include at least one of:

Radio Resource Control (RRC) signaling, a Media Access Control (MAC) Control Element (CE), and physical layer signaling.

According to a second aspect of the embodiments of the present disclosure, a method for indicating a transmission direction is provided. The method may be applied to a base station. The base station may configure at least one bandwidth part for a terminal. The method may include that:

a signaling notification for instructing the terminal to detect a transmission direction of each bandwidth part is set; and the signaling notification is sent to the terminal through target signaling to determine, according to the signaling notification, a detection mode for detecting the transmission direction of each of the at least one bandwidth part.

Optionally, the signaling notification may include first information, and/or second information and/or third information;

the first information may include one or more designated bandwidth parts, each of the one or more designated bandwidth parts being one designated from all configured bandwidth parts;

the second information may include a pairing relationship corresponding to each of the one or more designated bandwidth parts, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part; and the third information may include configuration information transmitted by transmission direction indication information about each of the one or more designated bandwidth parts.

Optionally, the signaling notification may include configuration information transmitted by transmission direction indication information about each of all the configured bandwidth parts.

Optionally, the notification information may further include a predefined rule, the predefined rule including a rule of determining a transmission direction of any other bandwidth part that is not designated to be detected according to the transmission direction of a designated bandwidth part.

According to a third aspect of the embodiments of the present disclosure, a device for indicating a transmission direction is provided. The device may be applied to a terminal. A base station may configure at least one bandwidth part for the terminal. The device may include:

a detection-mode determination module, configured to determine a detection mode for detecting a transmission direction of each of the at least one bandwidth part;

a detection module, configured to detect transmission direction indication information about a bandwidth part according to the detection mode; and a transmission-direction determination module, configured to determine a transmission direction of the bandwidth part according to the detected transmission direction indication information.

Optionally, the detection-mode determination module may include:

a first reception sub-module, configured to receive a first signaling notification that is sent by the base station through target signaling to instruct the terminal to detect the transmission direction of each of the at least one bandwidth part; and a first determination sub-module, configured to determine the detection mode for detecting the transmission direction of each of the at least one bandwidth part according to the first signaling notification.

Optionally, the first signaling notification may include first information, second information and third information;

the first information may include information about one or more designated bandwidth parts, each of the one or more designated bandwidth parts being one designated from all configured bandwidth parts;

the second information may include a pairing relationship corresponding to each of the one or more designated bandwidth parts, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part;

the third information may include configuration information transmitted by transmission direction indication information about each of the one or more designated bandwidth parts;

the first determination sub-module may include:

a second determination sub-module, configured to determine, according to the first information, a bandwidth part to be detected as one or more designated bandwidth parts;

a third determination sub-module, configured to determine, according to the second information, the pairing relationship corresponding to each of the one or more designated bandwidth parts; and a fourth determination sub-module, configured to determine, according to the third information, a detection position corresponding to each of one or more designated bandwidth parts.

Optionally, the detection module may include:

a first detection sub-module, configured to detect transmission direction indication information about each of the one or more designated bandwidth parts, the transmission direction indication information about the designated bandwidth part carrying information about a transmission direction of one or more indicated bandwidth parts;

the transmission-direction determination module may include:

a first direction determination sub-module, configured to determine, according to the pairing relationship, the transmission direction of one or more indicated bandwidth parts indicated in the transmission direction indication information about each of the one or more designated bandwidth parts as the transmission direction of each of the one or more indicated bandwidth parts.

Optionally, the detection-mode determination module may include:

a first bandwidth determination sub-module, configured to determine a bandwidth part to be detected as all configured bandwidth parts;

a first direction indication sub-module, configured to determine a transmission direction indicated in the transmission direction indication information about each of all the configured bandwidth parts as a transmission direction of the bandwidth part; and a first position determination sub-module, configured to determine the detection position corresponding to each of all the configured bandwidth parts.

Optionally, the first position determination sub-module may include:

a second reception sub-module, configured to receive a second signaling notification sent by the base station through target signaling, the second signaling notification including configuration information transmitted by the transmission direction indication information about each of all the configured bandwidth parts; and a second position determination sub-module, configured to determine, according to the second signaling notification, the detection position corresponding to each of all the configured bandwidth parts.

Optionally, the detection module may include:

a second detection sub-module, configured to detect the transmission direction indication information about each of all the configured bandwidth parts, the transmission direction indication information carrying information about a transmission direction of the bandwidth part;

the transmission-direction determination module may include:

a second direction determination sub-module, configured to determine a transmission direction indicated in the transmission direction indication information about each of all the configured bandwidth parts as the transmission direction of the bandwidth part.

Optionally, the detection-mode determination module may include:

a second bandwidth determination sub-module, configured to determine a bandwidth part to be detected as one or more designated bandwidth parts, each of the one or more designated bandwidth parts being one designated from all configured bandwidth parts;

a pairing relationship determination sub-module, configured to determine a pairing relationship corresponding to each of the one or more designated bandwidth parts, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part; and a third position determination sub-module, configured to determine a detection position corresponding to each of one or more designated bandwidth parts.

Optionally, the device may further include:

a first reception module, configured to receive a third signaling notification sent by the base station through target signaling, the third signaling notification including the one or more designated bandwidth parts and including the pairing relationship corresponding to each of the one or more designated bandwidth parts.

Optionally, the third position determination sub-module may include:

a third reception sub-module, configured to receive a fourth signaling notification sent by the base station through target signaling, the fourth signaling notification including configuration information transmitted by the transmission direction indication information about each of the one or more designated bandwidth parts; and a fourth position determination sub-module, configured to determine, according to the fourth signaling notification, the detection position corresponding to each of one or more designated bandwidth parts.

Optionally, the detection module may include:

a third detection sub-module, configured to detect transmission direction indication information about each of the one or more designated bandwidth parts, the transmission direction indication information about the designated bandwidth part carrying information about a transmission direction of one or more indicated bandwidth parts;

the transmission-direction determination module may include:

a third direction determination sub-module, configured to determine, according to the pairing relationship, the transmission direction of one or more indicated bandwidth parts indicated in the transmission direction indication information about each of the one or more designated bandwidth parts as the transmission direction of each of the one or more indicated bandwidth parts.

Optionally, the detection-mode determination module may include:

a third bandwidth determination sub-module, configured to determine a bandwidth part to be detected as one or more designated bandwidth parts, each of the one or more designated bandwidth parts being one designated from all configured bandwidth parts;

a second direction indication sub-module, configured to determine a transmission direction indicated in the transmission direction indication information about each of the one or more designated bandwidth parts as a transmission direction of the bandwidth part; and a fifth position determination sub-module, configured to determine a detection position corresponding to each of one or more designated bandwidth parts.

Optionally, the device may further include:

a second reception module, configured to receive a fifth signaling notification sent by the base station through target signaling, the fifth signaling notification including the one or more designated bandwidth parts.

Optionally, the fifth position determination sub-module may include:

a fourth reception sub-module, configured to receive a sixth signaling notification sent by the base station through target signaling, the sixth signaling notification including configuration information transmitted by the transmission direction indication information about each of the one or more designated bandwidth parts; and a sixth position determination sub-module, configured to determine, according to the sixth signaling notification, the detection position corresponding to each of one or more designated bandwidth parts.

Optionally, the detection module may include:

a fourth detection sub-module, configured to detect the transmission direction indication information about each of the one or more designated bandwidth parts, the transmission direction indication information carrying information about a transmission direction of the designated bandwidth part;

the transmission-direction determination module may include:

a fourth direction determination sub-module, configured to determine a transmission direction indicated in the transmission direction indication information about each of the one or more designated bandwidth parts as a transmission direction of the designated bandwidth part; and a fifth direction determination sub-module, configured to obtain a transmission direction of any other bandwidth part that is not designated to be detected from the transmission direction of the designated bandwidth part according to a predefined rule, the predefined rule including a rule of determining a transmission direction of any other bandwidth part that is not designated to be detected according to the transmission direction of the designated bandwidth part.

Optionally, the device may further include:

a third reception module, configured to receive a sixth signaling notification sent by the base station through target signaling, the sixth signaling notification including the predefined rule.

Optionally, the target signaling may include at least one of:

RRC signaling, a MAC CE, and physical layer signaling.

According to a fourth aspect of the embodiments of the present disclosure, a device for indicating a transmission direction is provided. The device may be applied to a base station. The base station may configure at least one bandwidth part for a terminal. The device may include:

a setting module, configured to set a signaling notification for instructing the terminal to detect a transmission direction of each bandwidth part; and a sending module, configured to send the signaling notification to the terminal through target signaling to determine, according to the signaling notification, a detection mode for detecting the transmission direction of each of the at least one bandwidth part.

Optionally, the signaling notification may include first information, and/or second information and/or third information;

the first information may include information about one or more designated bandwidth parts, each of the one or more designated bandwidth parts being one designated from all configured bandwidth parts;

the second information may include a pairing relationship corresponding to each of the one or more designated bandwidth parts, the pairing relationship being for representing a relationship between each of the one or more designated bandwidth parts and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part; and the third information may include configuration information transmitted by transmission direction indication information about each of the one or more designated bandwidth parts.

Optionally, the signaling notification may include configuration information transmitted by transmission direction indication information about each of all the configured bandwidth parts.

Optionally, the signaling notification may include a predefined rule, the predefined rule including a rule of determining a transmission direction of any other bandwidth part that is not designated to be detected according to a transmission direction of a designated bandwidth part.

According to a fifth aspect of the embodiments of the present disclosure, a non-transitory computer readable storage medium having a computer instruction stored thereon is provided. The computer instruction may be used for performing the method for indicating a transmission direction in the first aspect.

According to a sixth aspect of the embodiments of the present disclosure, a non-transitory computer readable storage medium having a computer instruction stored thereon is provided. The computer instruction may be used for performing the method for indicating a transmission direction in the second aspect.

According to a seventh aspect of the embodiments of the present disclosure, a device for indicating a transmission direction is provided. The device may be applied to a terminal. A base station may configure at least one bandwidth part for the terminal. The device may include:

a processor; and a memory configured to store an instruction executable for the processor, where the processor is configured to:

determine a detection mode for detecting a transmission direction of each of the at least one bandwidth part;

detect transmission direction indication information about a bandwidth part according to the detection mode; and determine a transmission direction of the bandwidth part according to the detected transmission direction indication information.

According to a seventh aspect of the embodiments of the present disclosure, a device for indicating a transmission direction is provided. The device may be applied to a base station. The base station may configure at least one bandwidth part for a terminal. The device may include:

a processor; and a memory configured to store an instruction executable for the processor, where the processor is configured to:

set a signaling notification for instructing the terminal to detect a transmission direction of each bandwidth part; and send the signaling notification to the terminal through target signaling, so that the terminal determines, according to the signaling notification, a detection mode for detecting the transmission direction of each of the at least one bandwidth part.

The technical solutions provided by the embodiments of the present disclosure may include the following beneficial effects.

In the embodiments of the present disclosure, a terminal may first determine a detection mode for detecting a transmission direction of each bandwidth part, detect transmission direction indication information about a corresponding bandwidth according to the detection mode, and then determine the transmission direction of the corresponding bandwidth part according to the detected transmission direction indication information. The terminal can accurately know a transmission direction of each bandwidth part by carrying out the above process, thereby reducing the detection cost of the terminal.

In the embodiments of the present disclosure, the terminal may completely determine a corresponding detection mode based on a signaling notification of a base station, so that the terminal can accurately know a transmission direction of each bandwidth part under the instruction of the base station, thereby reducing the detection cost of the terminal.

In the embodiments of the present disclosure, the terminal can know a transmission direction of each bandwidth part by detecting all bandwidth parts. With the above process, the terminal can accurately know a transmission direction of each bandwidth part, thereby improving the indication efficiency of the transmission direction.

In the embodiments of the present disclosure, the terminal can determine transmission directions of all indicated bandwidth parts by detecting one or more designated bandwidth parts, thereby knowing the transmission directions of all bandwidth parts. With the above process, the terminal can accurately know a transmission direction of each bandwidth part, thereby reducing the detection cost of the terminal.

In the embodiments of the present disclosure, the terminal can detect one or more designated bandwidth parts and can derive any other bandwidth part that is not designated to be detected from the transmission directions of the designated bandwidth parts according to a predefined rule, thereby knowing transmission directions of all configured bandwidth parts. With the above process, the terminal can accurately know a transmission direction of each bandwidth part, thereby reducing the detection cost of the terminal.

In the embodiments of the present disclosure, the terminal can determine a detection position corresponding to each bandwidth part according to configuration information indicated in a signaling notification, detect transmission direction indication information about a corresponding bandwidth at the determined detection position, and determine the transmission direction of the corresponding bandwidth part according to the detected transmission direction indication information. With the above process, the terminal can dynamically know a transmission direction of each bandwidth part, thereby improving the indication accuracy of the transmission direction.

In the embodiments of the present disclosure, the terminal can determine a bandwidth part to be detected according to a signaling notification, the bandwidth part to be detected including one or more designated bandwidth parts indicated to be detected by the base station. Transmission direction indication information about the corresponding bandwidth is detected, and after the transmission direction of each of the at least one bandwidth part is determined, the transmission direction of any other bandwidth part that is not designated to be detected can be obtained from the transmission direction of each designated bandwidth part according to a predefined rule. With the above process, the terminal can reduce detection overheads, and can also accurately know a transmission direction of each bandwidth part, thereby improving the indication efficiency of the transmission direction.

In the embodiments of the present disclosure, after the transmission direction indication information about a designated bandwidth part is detected and the transmission direction of each designated bandwidth is determined, the terminal can know the transmission direction of any other bandwidth part that is not designated to be detected according to a predefined rule provided by the base station, and finally can know the transmission directions of all bandwidth parts. With the above process, the terminal can dynamically know the transmission direction of each bandwidth part by means of a signaling notification sent by the base station, and the detection overheads of the terminal can also be reduced, thereby improving the indication efficiency of the transmission direction.

In the embodiments of the present disclosure, the base station can set a signaling notification for instructing a terminal to detect the transmission direction of each bandwidth part, and send the signaling notification to the terminal through target signaling, so that the terminal can determine a detection mode for detecting the transmission direction of each bandwidth part according to the signaling notification and conduct detection according to the detection mode to finally know the transmission direction of each bandwidth part, thereby improving the indication reliability of the transmission direction, also improving the indication efficiency of the transmission direction, and reducing the detection overheads of the terminal.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present invention and, together with the description, serve to explain the principles of the present invention.

FIG. 1C is a schematic diagram illustrating that a base station configures two bandwidth parts for a terminal according to an exemplary embodiment.

FIG. 2A is a flowchart of another method for indicating a transmission direction according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are for the purpose of describing particular embodiments only, and are not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It should be understood that although the terms "first", "second", "third", etc. may be used in the present disclosure to describe various information, such information should not be limited to these terms. These terms are only used to distinguish the same type of information from each other. For example, without departing from the scope of the present disclosure, first information may also be called second information and, similarly, second information may also be called first information. For example, term "if" used here may be explained as "while" or "when" or "responsive to determining", which depends on the context.

Figure 1A:
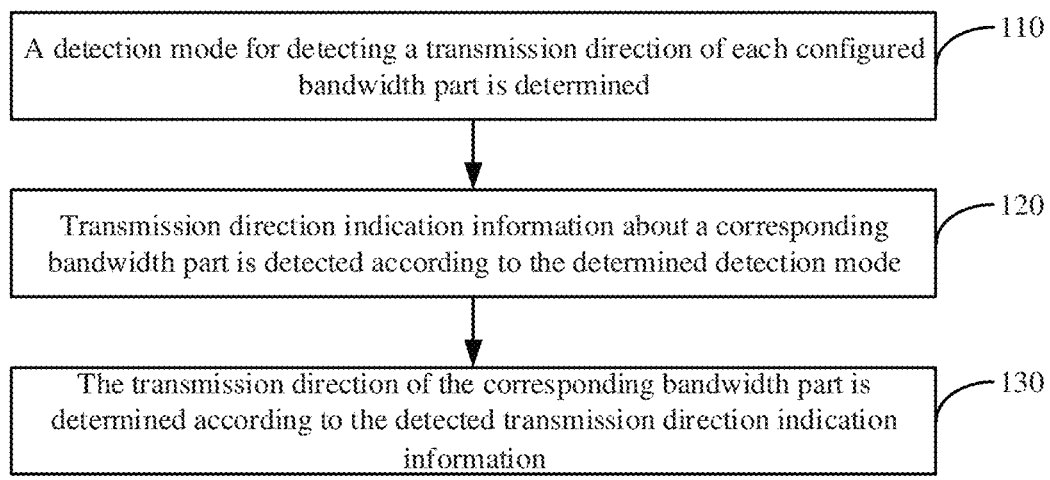
FIG. 1A is a flowchart of a method for indicating a transmission direction according to an exemplary embodiment.
Figure 1B:
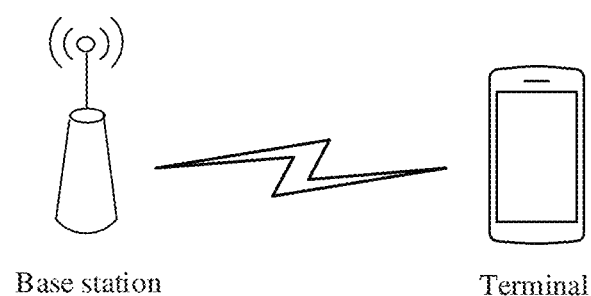
FIG. 1B is a scene diagram of a method for indicating a transmission direction according to an exemplary embodiment.

FIG. 1A is a flowchart of a method for indicating a transmission direction according to an exemplary embodiment. FIG. 1B is a scene diagram of a method for indicating a transmission direction according to an exemplary embodiment. The method for indicating a transmission direction may be applied to a terminal. A base station may configure at least one bandwidth part for the terminal. As shown in FIG. 1A, the method for indicating a transmission direction includes the following steps 110-130.

In step 110, a detection mode for detecting a transmission direction of each configured bandwidth part is determined.

In an embodiment, the bandwidth part may be understood as a set of part of Physical Resource Blocks (PRB) in one carrier. Since the bandwidth of one carrier may be wider in a new generation communication system, the terminal may not be able to support the entire bandwidth and can support transmission on a bandwidth part only. For example, the base station configures two bandwidth parts for the terminal, as shown in FIG. 1C.

In an embodiment, the transmission direction indication information about each bandwidth part may be sent by the base station to the terminal. Optionally, the base station may send transmission direction indication information by using a Group Common Physical Downlink Control Channel (GC-PDCCH).

In an embodiment, there may be many methods for determining a detection mode. The detection may be carried out according to a detection mode which is set by the terminal and the base station in advance, or may be carried out according to a mode customized by the base station.

In step 120, transmission direction indication information about a corresponding bandwidth part is detected according to the determined detection mode.

In step 130, the transmission direction of the corresponding bandwidth part is determined according to the detected transmission direction indication information.

In an exemplary scene, as shown in FIG. 1B, the base station may configure one or more bandwidth parts for the terminal, and the numerology on different bandwidth parts may be different. In this case, the base station may set a signaling notification for instructing the terminal to detect a transmission direction of each bandwidth part, and send the signaling notification to the terminal through target signaling, so that the terminal can determine, according to the signaling notification, a detection mode for detecting the transmission direction of each bandwidth part, detect transmission direction indication information about a corresponding bandwidth according to the detection mode, and determine the transmission direction of the corresponding bandwidth part according to the detected transmission direction indication information.

In the present embodiment, through step 110 to step 130, a terminal may determine a detection mode for detecting a transmission direction of each bandwidth part, detect transmission direction indication information about a corresponding bandwidth according to the detection mode, and then determine the transmission direction of the corresponding bandwidth part according to the detected transmission direction indication information. With the above process, the terminal can accurately know a transmission direction of each bandwidth part, thereby reducing the detection cost of the terminal.

In an embodiment, for step 110, the terminal may determine the corresponding detection mode completely according to the signaling notification from the base station.

In this way, the terminal may receive a first signaling notification sent by the base station through target signaling for instructing the terminal to detect a transmission direction of each bandwidth part, and determine a detection mode for detecting the transmission direction of each bandwidth part according to the first signaling notification, so that the terminal can accurately know the transmission direction of each bandwidth part under the instruction of the base station, thereby reducing the detection cost of the terminal.

In an embodiment, the first signaling notification may include first information, second information and third information. The first information may include information about one or more designated bandwidth parts, each of the one or more designated bandwidth parts being one designated from all configured bandwidth parts. The second information may include a pairing relationship corresponding to each of the one or more designated bandwidth parts, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part. The third information may include configuration information transmitted by the transmission direction indication information about each of the one or more designated bandwidth parts.

For example, the base station configures four bandwidth parts for the terminal, namely, a bandwidth part 1, a bandwidth part 2, a bandwidth part 3, and a bandwidth part 4. The bandwidth part 1 and the bandwidth part 4 configured by the base station are both designated bandwidth parts, indicated bandwidth parts in a pairing relationship corresponding to the configured designated bandwidth part 1 include the bandwidth part 1, the bandwidth part 2 and the bandwidth part 3, and a witted bandwidth part in a pairing relationship corresponding to the configured designated bandwidth part 4 includes the bandwidth part 4.

Correspondingly, the terminal may implement step 110 in the following manners:

a bandwidth part to be detected is determined as one or more designated bandwidth parts according to the first information; a pairing relationship corresponding to each of the one or more designated bandwidth parts is determined according to the second information; and a detection position corresponding to each of one or more designated bandwidth parts is determined according to the third information.

Correspondingly, the terminal may implement step 120 in the following manners:

transmission direction indication information about each designated bandwidth part is detected, the transmission direction indication information about the designated bandwidth part carrying information about a transmission direction of one or more indicated bandwidth parts.

The terminal may implement step 130 in the following manners:

the transmission direction of one or more indicated bandwidth parts indicated in the transmission direction indication information about each designated bandwidth part is determined as the transmission direction of each of the indicated bandwidth parts according to the pairing relationship determined by the second information.

In an embodiment, for step 110, the terminal may determine a corresponding detection mode according to a protocol agreed in advance or a combination of a protocol agreed in advance and a signaling notification from the base station, which may include, but is not limited to, the following modes.

In the first manner, all bandwidth parts are detected.

1-1: The terminal determines a bandwidth part to be detected as all configured bandwidth parts.

1-2: The terminal determines a transmission direction indicated in the transmission direction indication information about each configured bandwidth part as a transmission direction of the bandwidth part.

1-3: The terminal determines a detection position corresponding to configured bandwidth part.

Optionally, 1-1, 1-2 and 1-3 may be determined according to a protocol agreed in advance.

Optionally, 1-3 may also be carried out through a signaling notification from the base station, specifically:

the terminal receives a second signaling notification sent by the base station through target signaling, the second signaling notification including configuration information transmitted by the transmission direction indication information about each configured bandwidth part; and the terminal determines a detection position corresponding to each configured bandwidth part according to the second signaling notification.

The detected positions corresponding to the configured bandwidth parts may be the same or different. If they are the same, they may be detected at the same time; if they are different, they need to be detected separately.

Corresponding to the first manner, the terminal may implement the step 120 in the following manners:

transmission direction indication information about each configured bandwidth part is detected, the transmission direction indication information carrying information about a transmission direction of the bandwidth part.

Corresponding to the first manner, the terminal may implement the step 130 in the following manners:

a transmission direction indicated in the transmission direction indication information about each configured bandwidth part is determined as a transmission direction of the bandwidth part.

For example, the base station configures four bandwidth parts for the terminal, namely, a bandwidth part 1, a bandwidth part 2, a bandwidth part 3, and a bandwidth part 4. The terminal may detect the bandwidth part 1 to obtain a transmission direction of the bandwidth part 1. The terminal may detect the bandwidth part 2 to obtain a transmission direction of the bandwidth part 2. The terminal may detect the bandwidth part 3 to obtain a transmission direction of the bandwidth part 3. The terminal may detect the bandwidth part 4 to obtain a transmission direction of the bandwidth part 4.

In the present embodiment, through the first manner, the terminal may know a transmission direction of each bandwidth part by detecting all bandwidth parts. With the above process, the terminal can accurately know a transmission direction of each bandwidth part, thereby improving the indication efficiency of the transmission direction.

In the second manner, a designated bandwidth part is detected.

2-1: The terminal determines a bandwidth part to be detected as one or more designated bandwidth parts, each of the one or more designated bandwidth parts being one designated from all configured bandwidth parts.

2-2: The terminal determines a pairing relationship corresponding to each designated bandwidth part, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part.

2-3: The terminal determines a detection position corresponding to each designated bandwidth part.

Optionally, 2-1, 2-2 and 2-3 may be determined according to a protocol agreed in advance.

Optionally, 2-1 and 2-2 may also be carried out by use of a signaling notification from the base station, specifically:

a third signaling notification sent by the base station through target signaling is received, the third signaling notification including the one or more designated bandwidth parts and including the pairing relationship corresponding to each designated bandwidth part.

Optionally, 2-3 may also be carried out by use of a signaling notification from the base station, specifically:

a fourth signaling notification sent by the base station through target signaling is received, the fourth signaling notification including configuration information transmitted by the transmission direction indication information about each designated bandwidth part; and a detection position corresponding to each designated bandwidth part is determined according to the fourth signaling notification.

Corresponding to the second manner, the terminal may implement the step 120 in the following manners:

transmission direction indication information about each designated bandwidth part is detected, the transmission direction indication information about the designated bandwidth part carrying information about a transmission direction of one or more indicated bandwidth parts.

Corresponding to the second manner, the terminal may implement the step 130 in the following manners:

the transmission direction of one or more indicated bandwidth parts indicated in the transmission direction indication information about each designated bandwidth part is determined as the transmission direction of each indicated bandwidth part according to the pairing relationship.

For example, the base station configures four bandwidth parts for the terminal, namely, a bandwidth part 1, a bandwidth part 2, a bandwidth part 3, and a bandwidth part 4. The bandwidth part 1 configured by the base station is a designated bandwidth part, and indicated bandwidth parts in a pairing relationship corresponding to the configured designated bandwidth part 1 include the bandwidth part 1, the bandwidth part 2, the bandwidth part 3, and the bandwidth part 4, so that the terminal can obtain transmission directions of four bandwidth parts by detecting only one bandwidth part, thereby improving the indication efficiency of the transmission direction.

For another example, the base station configures four bandwidth parts for the terminal, namely, a bandwidth part 1, a bandwidth part 2, a bandwidth part 3, and a bandwidth part 4. The bandwidth part 1 and the bandwidth part 3 configured by the base station are designated bandwidth parts, indicated bandwidth parts in a pairing relationship corresponding to the configured designated bandwidth part 1 include the bandwidth part 1 and the bandwidth part 2, and indicated bandwidth parts in a pairing relationship corresponding to the configured designated bandwidth part 3 include the bandwidth part 3 and the bandwidth part 4, so that the terminal can obtain transmission directions of four bandwidth parts by detecting only two bandwidth parts, thereby improving the indication efficiency of the transmission direction.

For another example, the base station configures four bandwidth parts for the terminal, namely, a bandwidth part 1, a bandwidth part 2, a bandwidth part 3, and a bandwidth part 4. The bandwidth part 1, the bandwidth part 2, the bandwidth part 3 and the bandwidth part 4 configured by the base station are designated bandwidth parts, an indicated bandwidth part in a pairing relationship corresponding to the configured designated bandwidth part 1 includes the bandwidth part 2, an indicated bandwidth part in a pairing relationship corresponding to the configured designated bandwidth part 2 includes the bandwidth part 3, an indicated bandwidth part in a pairing relationship corresponding to the configured designated bandwidth part 3 includes the bandwidth part 4, and an indicated bandwidth part in a pairing relationship corresponding to the configured designated bandwidth part 4 includes the bandwidth part 1, so that the terminal can obtain transmission directions of four bandwidth parts by the pairing relationship, thereby improving the indication reliability of the transmission direction.

In the present embodiment, through the second manner, the terminal can determine transmission directions of all indicated bandwidth parts by detecting one or more designated bandwidth parts, thereby knowing the transmission directions of all bandwidth parts. With the above process, the terminal can accurately know a transmission direction of each bandwidth part, thereby reducing the detection cost of the terminal.

In the third manner, a designated bandwidth part is detected.

3-1: The terminal determines a bandwidth part to be detected as one or more designated bandwidth parts, each of the one or more designated bandwidth parts being one designated from all configured bandwidth parts.

3-2: The terminal determines a transmission direction indicated in the transmission direction indication information about each of the one or more designated bandwidth parts as a transmission direction of the bandwidth part.

3-3: The terminal determines a detection position corresponding to each of one or more designated bandwidth parts.

Optionally, 3-1, 3-2 and 3-3 may be determined according to a protocol agreed in advance.

Optionally, 3-1 may also be carried out by use of a signaling notification from the base station, specifically:

a fifth signaling notification sent by the base station through target signaling is received, the fifth signaling notification including the one or more designated bandwidth parts.

Optionally, 3-3 may also be carried out by use of a signaling notification from the base station, specifically:

a sixth signaling notification sent by the base station through target signaling is received, the sixth signaling notification including configuration information transmitted by the transmission direction indication information about each designated bandwidth part; and a detection position corresponding to each designated bandwidth part is determined according to the sixth signaling notification.

Corresponding to the third manner, the terminal may implement the step 120 in the following manners:

transmission direction indication information about each designated bandwidth part is detected, the transmission direction indication information carrying information about a transmission direction of the designated bandwidth part.

Corresponding to the third manner, the terminal may implement the step 130 in the following manners:

a transmission direction indicated in the transmission direction indication information about each designated bandwidth part is determined as a transmission direction of the designated bandwidth part; and a transmission direction of any other bandwidth part that is not designated to be detected is obtained from the transmission direction of the designated bandwidth part according to a predefined rule, the predefined rule including a rule of determining a transmission direction of any other bandwidth part that is not designated to be detected according to the transmission direction of the designated bandwidth part.

Optionally, the predefined rule may also be carried out by use of a signaling notification from the base station, specifically:

a sixth signaling notification sent by the base station through target signaling is received, the sixth signaling notification including a predefined rule, the predefined rule including a rule of determining a transmission direction of any other bandwidth part that is not designated to be detected according to the transmission direction of the designated bandwidth part.

For example, the base station configures four bandwidth parts for the terminal, namely, a bandwidth part 1, a bandwidth part 2, a bandwidth part 3, and a bandwidth part 4. The predefined rule is that the bandwidth part 1, the bandwidth part 2, the bandwidth part 3, and the bandwidth part 4 are all the same, so that the terminal can detect the direction of one of the bandwidth parts only to derive a transmission directions of other bandwidth parts according to the predefined rule.

For another example, the base station configures four bandwidth parts for the terminal, namely, a bandwidth part 1, a bandwidth part 2, a bandwidth part 3, and a bandwidth part 4. The predefined rule is that the bandwidth part 1 and the bandwidth part 2 are opposite, so that after the transmission direction of the bandwidth part 1 is detected, the terminal can derive the transmission direction of the bandwidth part 2 according to the predefined rule.

In the present embodiment, through the third manner, the terminal can detect one or more designated bandwidth parts, and derive any other bandwidth part that is not designated to be detected from the transmission directions of the designated bandwidth parts according to a predefined rule, thereby knowing transmission directions of all configured bandwidth parts. With the above process, the terminal can accurately know a transmission direction of each bandwidth part, thereby reducing the detection cost of the terminal.

In addition, since the content included in the signaling notification from the base station is different, the corresponding process of indicating the transmission direction is also different:

(1) The signaling notification may include configuration information transmitted by transmission direction indication information about each bandwidth part. The process of indicating the transmission direction may refer to the embodiment in FIG. 2A, and will not be described in detail herein.

(2) The signaling notification may include information about one or more designated bandwidth parts. The process of indicating the transmission direction may refer to the embodiment in FIG. 3, and will not be described in detail herein.

(3) The signaling notification may include one or more designated bandwidth parts and further include a predefined rule, the predefined rule including a rule of determining a transmission direction of any other bandwidth part that is not designated to be detected according to the transmission direction of the designated bandwidth part. The process of indicating the transmission direction may refer to the embodiment in FIG. 4, and will not be described in detail herein.

Optionally, the base station may send the signaling notification to the terminal through target signaling. The target signaling may include at least one of the following: RRC signaling, a MAC CE, and physical layer signaling.

In the embodiments of the present disclosure, the base station may send notification information to the terminal by sending RRC signaling, a MAC CE or physical layer signaling to the terminal, and the terminal may receive the signaling directly. The physical layer signaling generally refers to signaling carried by a PDCCH.

The technical solutions provided by the embodiments of the present disclosure are described below by using specific embodiments.

FIG. 2A is a flowchart of another method for indicating a transmission direction according to an exemplary embodiment. The method for indicating a transmission direction may be applied to a terminal. A base station configures at least one bandwidth part for the terminal. As shown in FIG. 2A, the method for indicating a transmission direction includes the following steps 210-240.

In step 210, a signaling notification sent by the base station through target signaling for instructing the terminal to detect a transmission direction of each bandwidth part is received, the signaling notification including configuration information transmitted by the transmission direction indication information about each bandwidth part. The target signaling may include at least one of the following: RRC signaling, system information, a MAC CE, and physical layer signaling.

In step 220, a detection position corresponding to each bandwidth part is determined according to the configuration information transmitted by the transmission direction indication information about each bandwidth part. The configuration information may include information such as a configuration period, transmission positions in a time domain and a frequency domain, beam information, and information about the transmitted numerology; and the information included in the configuration information is applicable to all embodiments of the present disclosure.

Figure 2B:
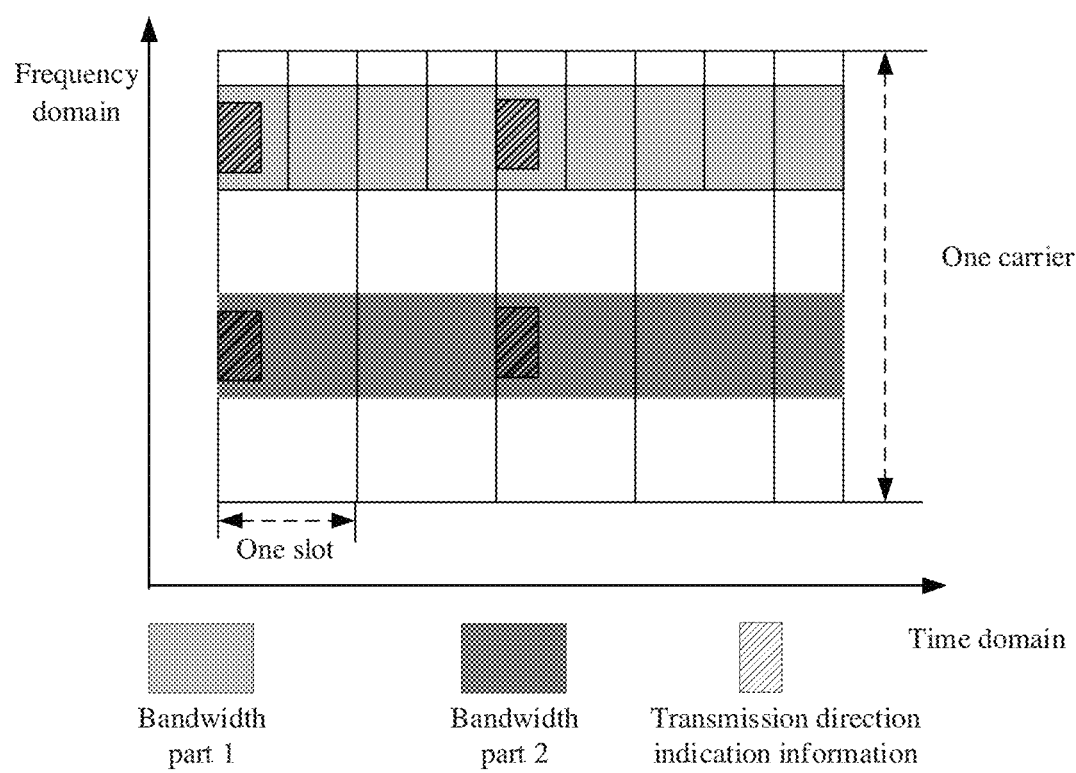
FIG. 2B is a schematic diagram illustrating that two bandwidth parts are detected simultaneously according to an exemplary embodiment.
Figure 2C:
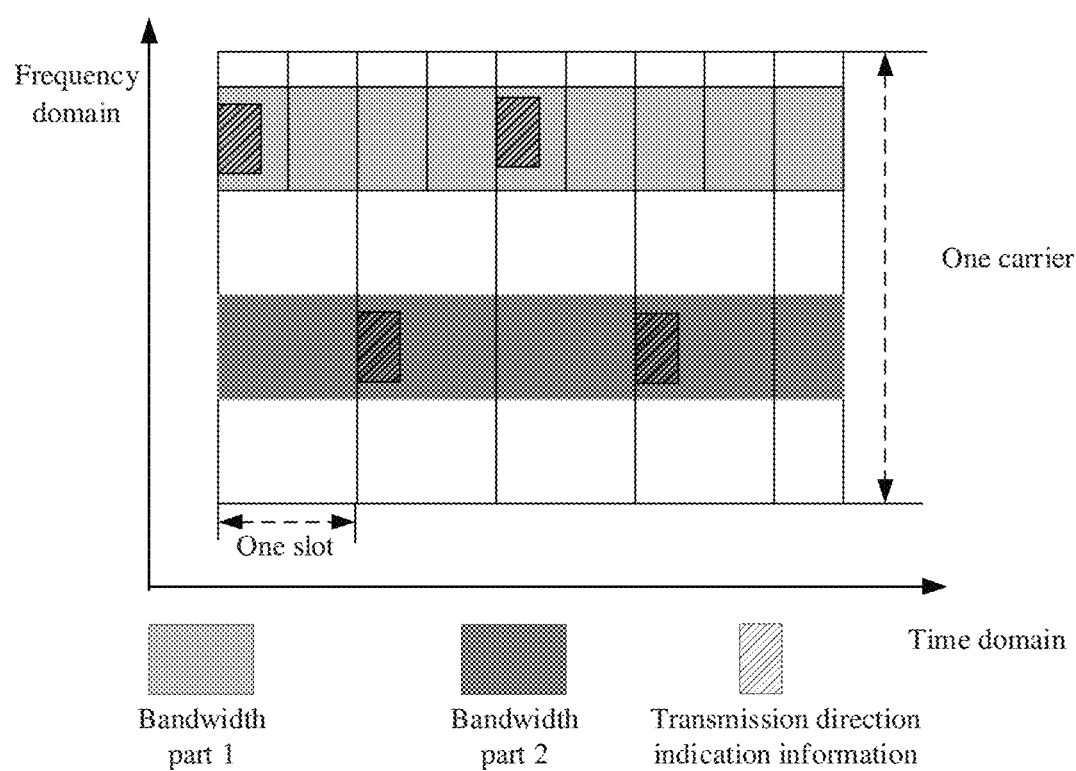
FIG. 2C is a schematic diagram illustrating that two bandwidth parts are detected within different periods of time according to an exemplary embodiment.

In the embodiments of the present disclosure, the detection position corresponding to each bandwidth part determined according to the configuration information transmitted by the transmission direction indication information about each bandwidth part may be the same, for example, the transmission direction indication information about two bandwidth parts in FIG. 1C is detected at the same position, as shown in FIG. 2B. Or the determined detection positions may be different, for example, the transmission direction indication information about two bandwidth parts in FIG. 1C is detected at different positions, as shown in FIG. 2C.

In step 230, transmission direction indication information about a corresponding bandwidth is detected at the determined detection position corresponding to each bandwidth part.

In step 240, the transmission direction of the corresponding bandwidth part is determined according to the detected transmission direction indication information.

In the present embodiment, through step 210 to step 240, the terminal can determine a detection position corresponding to each bandwidth part according to configuration information indicated in a signaling notification, detect transmission direction indication information about a corresponding bandwidth at the determined detection position, and determine the transmission direction of the corresponding bandwidth part according to the detected transmission direction indication information. With the above process, the terminal can dynamically know a transmission direction of each bandwidth part, thereby improving the indication accuracy of the transmission direction.

Figure 3:
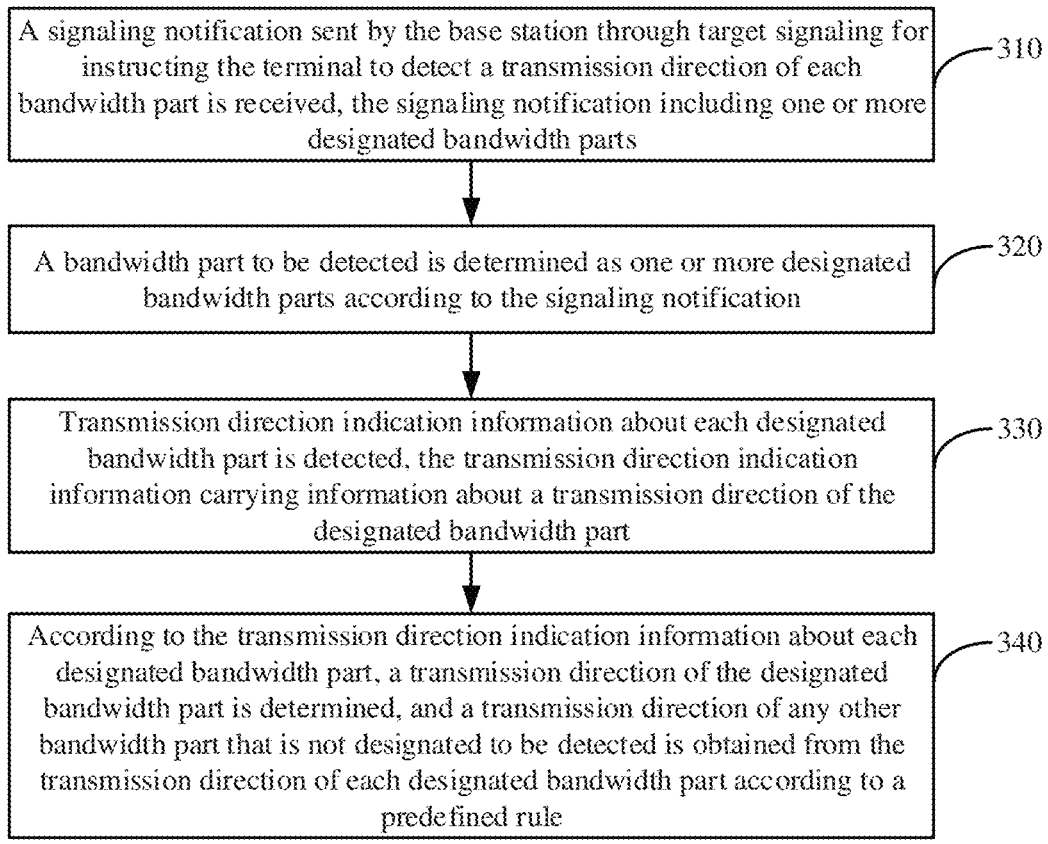
FIG. 3 is a flowchart of another method for indicating a transmission direction according to an exemplary embodiment.

FIG. 3 is a flowchart of another method for indicating a transmission direction according to an exemplary embodiment. The method for indicating a transmission direction may be applied to a terminal. A base station configures at least one bandwidth part for the terminal. As shown in FIG. 3, the method for indicating a transmission direction includes the following steps 310-340.

In step 310, a signaling notification sent by the base station through target signaling for instructing the terminal to detect a transmission direction of each bandwidth part is received, the signaling notification including one or more designated bandwidth parts. The target signaling may include at least one of the following: RRC signaling, system information, a MAC CE, and physical layer signaling.

In step 320, a bandwidth part to be detected is determined as one or more designated bandwidth parts according to the signaling notification.

In step 330, transmission direction indication information about each designated bandwidth part is detected, the transmission direction indication information carrying information about a transmission direction of the designated bandwidth part.

In step 340, according to the transmission direction indication information about each designated bandwidth part, a transmission direction of the designated bandwidth part is determined, and a transmission direction of any other bandwidth part that is not designated to be detected is obtained from the transmission direction of each designated bandwidth part according to a predefined rule.

In the embodiments of the present disclosure, the predefined rule may be a rule negotiated by the base station and the terminal for knowing the transmission direction of other bandwidth parts from the transmission direction of part of the bandwidth parts. For example: the base station configures four bandwidth parts for the terminal, namely a bandwidth part 1, a bandwidth part 2, a bandwidth part 3 and a bandwidth part 4; the predefined rule is that the transmission directions of the bandwidth part 1 and the bandwidth part 3 are the same and the transmission directions of the bandwidth part 2 and the bandwidth part 4 are the same; in a case that the base station designates to detect the bandwidth part 1 and the bandwidth part 2, the transmission directions of the bandwidth part 3 and the bandwidth part 4 can be known according to the predefined rule after the transmission directions of the bandwidth part 1 and the bandwidth part 2 are detected, so that the indication efficiency of the transmission direction can be improved, and the detection overheads of the terminal can be reduced.

In the present embodiment, through step 310 to step 340, the terminal can determine a bandwidth part to be detected according to a signaling notification; the bandwidth part to be detected may include one or more designated bandwidth parts instructed to be detected by the base station. Transmission direction indication information about a corresponding bandwidth may be detected, and after the transmission direction of each bandwidth part is determined, the transmission direction of any other bandwidth part that is not designated to be detected can be known from the transmission direction of each designated bandwidth part according to a predefined rule. With the above process, the terminal can reduce detection overheads, and also can accurately know a transmission direction of each bandwidth part, thereby improving the indication efficiency of the transmission direction.

Figure 4:
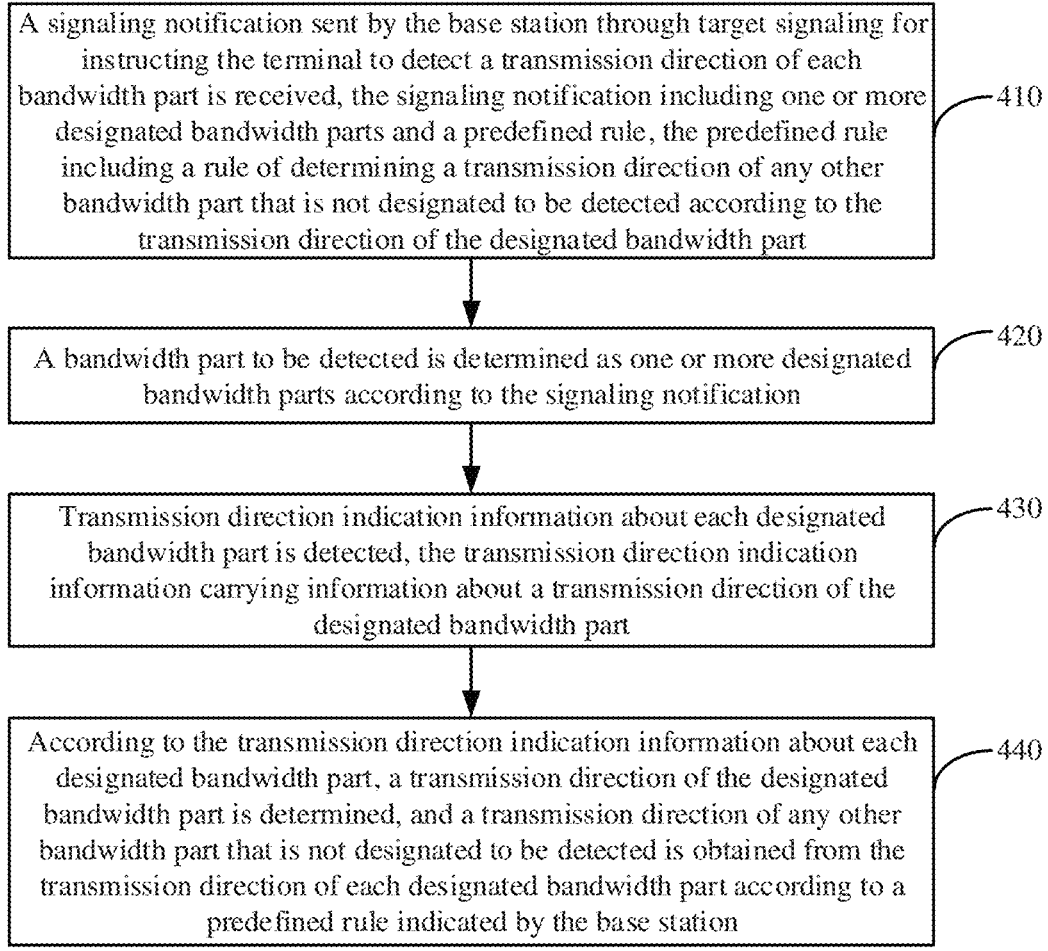
FIG. 4 is a flowchart of another method for indicating a transmission direction according to an exemplary embodiment.

FIG. 4 is a flowchart of another method for indicating a transmission direction according to an exemplary embodiment. The method for indicating a transmission direction may be applied to a terminal. A base station configures at least one bandwidth part for the terminal. As shown in FIG. 4, the method for indicating a transmission direction includes the following steps 410-440.

In step 410, a signaling notification sent by the base station through target signaling for instructing the terminal to detect a transmission direction of each bandwidth part is received, the signaling notification including one or more designated bandwidth parts and a predefined rule, the predefined rule including a rule of determining a transmission direction of any other bandwidth part that is not designated to be detected according to the transmission direction of the designated bandwidth part. The target signaling may include at least one of the following: RRC signaling, system information, a MAC CE, and physical layer signaling.

In the embodiments of the present disclosure, the predefined rule may be defined by the base station and sent to the terminal by the base station, and may include a rule of determining a transmission direction of any other bandwidth part that is not designated to be detected according to the transmission direction of the designated bandwidth part. For example, the base station configures four bandwidth parts for the terminal, namely a bandwidth part 1, a bandwidth part 2, a bandwidth part 3 and a bandwidth part 4, and designates the terminal to detect transmission direction indication information about the bandwidth part 1 and the bandwidth part 2. In order to enable the terminal to know the transmission directions of all bandwidth parts, the base station also may define that the transmission directions of the bandwidth part 1 and the bandwidth part 3 are the same and the transmission directions of the bandwidth part 2 and the bandwidth part 4 are the same. Therefore, after the transmission direction indication information about the bandwidth part 1 and the bandwidth part 2 is detected and the transmission directions of the bandwidth part 1 and the bandwidth part 2 are obtained, the terminal may know the transmission directions of the bandwidth part 3 and the bandwidth part 4 according to the predefined rule, and finally, the terminal can know the transmission directions of all bandwidth parts, namely four bandwidth parts: the bandwidth part 1, the bandwidth part 2, the bandwidth part 3 and the bandwidth part 4.

In step 420, a bandwidth part to be detected is determined as one or more designated bandwidth parts according to the signaling notification.

In step 430, transmission direction indication information about each designated bandwidth part is detected, the transmission direction indication information carrying information about a transmission direction of the designated bandwidth part.

In step 440, according to the transmission direction indication information about each designated bandwidth part, a transmission direction of the designated bandwidth part is determined, and a transmission direction of any other bandwidth part that is not designated to be detected is obtained from the transmission direction of each designated bandwidth part according to a predefined rule indicated by the base station.

In the present embodiment, through step 410 to step 440, the signaling notification may include information about a designated bandwidth part and further include a predefined rule, so that after the transmission direction indication information about the designated bandwidth part is detected and the transmission direction of each designated bandwidth part is determined, the terminal can know the transmission direction of any other bandwidth part that is not designated to be detected according to a predefined rule provided by the base station, and finally know the transmission directions of all bandwidth parts. With the above process, the terminal can dynamically know the transmission direction of each bandwidth part by means of a signaling notification sent by the base station and the detection overheads of the terminal can be reduced, thereby improving the indication efficiency of the transmission direction.

Figure 5:
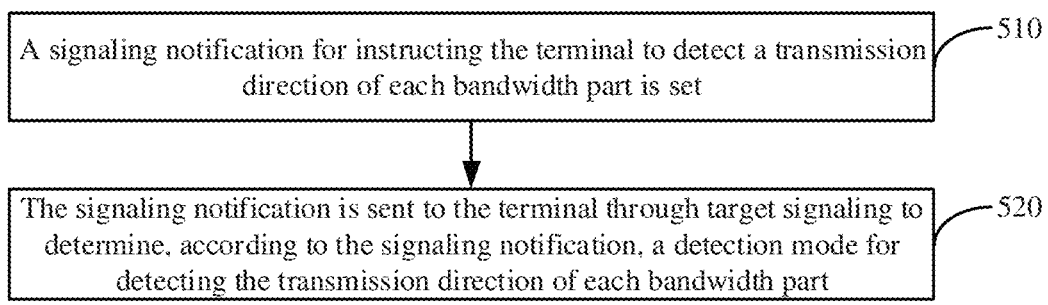
FIG. 5 is a flowchart of a method for indicating a transmission direction according to an exemplary embodiment.

FIG. 5 is a flowchart of a method for indicating a transmission direction according to an exemplary embodiment. The method for indicating a transmission direction may be applied to a base station. The base station configures at least one bandwidth part for a terminal. As shown in FIG. 5, the method for indicating a transmission direction includes the following steps 510-520.

In step 510, a signaling notification for instructing the terminal to detect a transmission direction of each bandwidth part is set.

In an embodiment, the signaling notification may include first information, and/or second information and/or third information. The first information may include information about one or more designated bandwidth parts, each designated bandwidth part being one designated from all configured bandwidth parts. The second information includes a pairing relationship corresponding to each designated bandwidth part, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part. The third information may include configuration information transmitted by the transmission direction indication information about each designated bandwidth part.

In an embodiment, the signaling notification may include configuration information transmitted by transmission direction indication information about each configured bandwidth part.

In an embodiment, the signaling notification may include a predefined rule, the predefined rule including a rule of determining a transmission direction of any other bandwidth part that is not designated to be detected according to the transmission direction of the designated bandwidth part.

In step 520, the signaling notification is sent to the terminal through target signaling, so as to determine, according to the signaling notification, a detection mode for detecting the transmission direction of each bandwidth part.

In the present embodiment, through step 510 to step 520, the base station nay set a signaling notification for instructing the terminal to detect the transmission direction of each bandwidth part, and send the signaling notification to the terminal through target signaling, so that the terminal can determine a detection mode for detecting the transmission direction of each bandwidth part according to the signaling notification, and conduct detection according to the detection mode to finally know the transmission direction of each bandwidth part, thereby improving the indication reliability of the transmission direction, also improving the indication efficiency of the transmission direction, and reducing the detection overheads of the terminal.

Corresponding to the aforementioned embodiment of the method for indicating a transmission direction, the present disclosure also provides an embodiment of a device for indicating a transmission direction.

Figure 6:
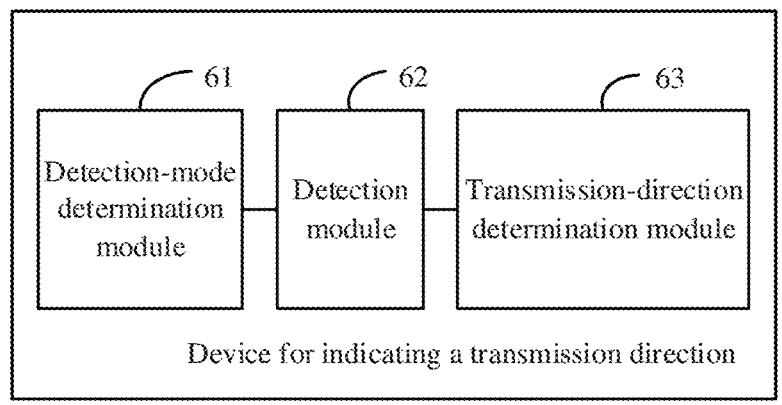
FIG. 6 is a block diagram of a device for indicating a transmission direction according to an exemplary embodiment.

FIG. 6 is a block diagram of a device for indicating a transmission direction according to an exemplary embodiment. The device for indicating a transmission direction may be applied to a terminal and implement the method for indicating a transmission direction in FIG. 1A. A base station configures at least one bandwidth part for the terminal. As shown in FIG. 6, the device for indicating a transmission direction may include:

a detection-mode determination module 61, configured to determine a detection mode for detecting a transmission direction of each of the at least one bandwidth part;

a detection module 62, configured to detect transmission direction indication information about a corresponding bandwidth part according to the detection mode; and a transmission-direction determination module 63, configured to determine the transmission direction of the corresponding bandwidth part according to the detected transmission direction indication information.

Figure 7:
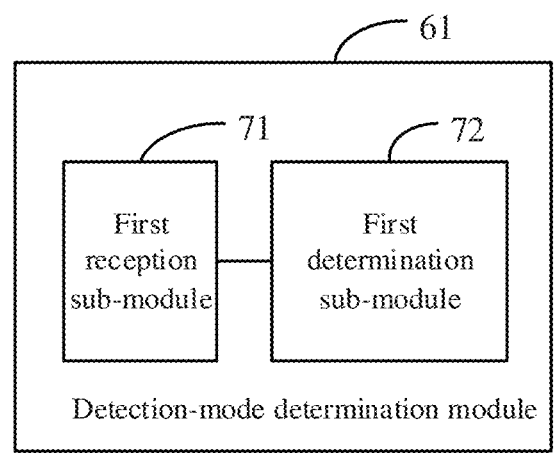
FIG. 7 is a block diagram of another device for indicating a transmission direction according to an exemplary embodiment.

FIG. 7 is a block diagram of another device for indicating a transmission direction according to an exemplary embodiment. The device for indicating a transmission direction may be applied to a terminal, and established on the basis of FIG. 6. The detection-mode determination module 61 may include:

a first reception sub-module 71, configured to receive a first signaling notification that is sent by the base station through target signaling to instruct the terminal to detect a transmission direction of each bandwidth part; and a first determination sub-module 72, configured to determine a detection mode for detecting the transmission direction of each of the at least one bandwidth part according to the first signaling notification.

Optionally, the first signaling notification may include first information, second information and third information;

the first information may include information about one or more designated bandwidth parts, each designated bandwidth part being one designated from all configured bandwidth parts;

the second information may include a pairing relationship corresponding to each designated bandwidth part, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part;

the third information may include configuration information transmitted by the transmission direction indication information about each designated bandwidth part;

the first determination sub-module 72 may include:

a second determination sub-module, configured to determine, according to the first information, a bandwidth part to be detected as one or more designated bandwidth parts;

a third determination sub-module, configured to determine, according to the second information, the pairing relationship corresponding to each designated bandwidth part; and a fourth determination sub-module, configured to determine, according to the third information, a detection position corresponding to each designated bandwidth part.

Optionally, the detection module 62 may include:

a first detection sub-module, configured to detect transmission direction indication information about each designated bandwidth part, the transmission direction indication information about the designated bandwidth part carrying information about a transmission direction of one or more indicated bandwidth parts;

the transmission-direction determination module 63 may include:

a first direction determination sub-module, configured to determine, according to the pairing relationship, the transmission direction of one or more indicated bandwidth parts indicated in the transmission direction indication information about each designated bandwidth part as the transmission direction of each indicated bandwidth part.

Figure 8:
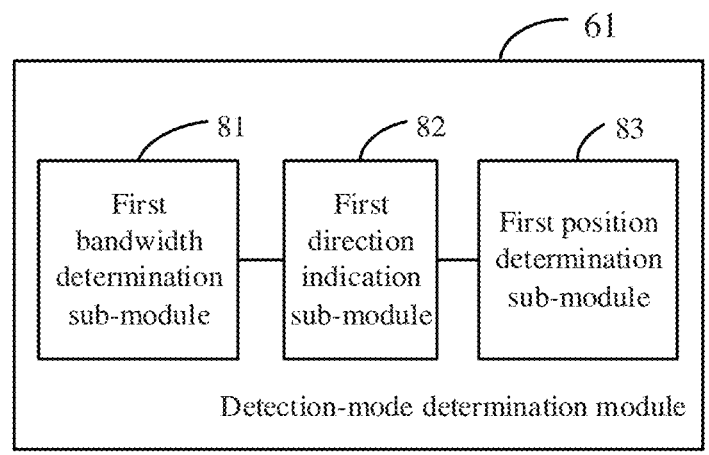
FIG. 8 is a block diagram of another device for indicating a transmission direction according to an exemplary embodiment.

FIG. 8 is a block diagram of another device for indicating a transmission direction according to an exemplary embodiment. The device for indicating a transmission direction may be applied to a terminal, and may be constructed on the basis of FIG. 6. The detection-mode determination module 61 may include:

a first bandwidth determination sub-module 81, configured to determine a bandwidth part to be detected as all configured bandwidth parts;

a first direction indication sub-module 82, configured to determine a transmission direction indicated in the transmission direction indication information about each of the at least one bandwidth part as an own transmission direction of the bandwidth part; and a first position determination sub-module 83, configured to determine a detection position corresponding to each of the at least one bandwidth part.

Optionally, the first position determination sub-module 83 may include:

a second reception sub-module, configured to receive a second signaling notification sent by the base station through target signaling, the second signaling notification including configuration information transmitted by the transmission direction indication information about each of the at least one bandwidth part; and a second position determination sub-module, configured to determine, according to the second signaling notification, a detection position corresponding to each of the at least one bandwidth part.

Optionally, the detection module 62 may include:

a second detection sub-module, configured to detect transmission direction indication information about each of the at least one bandwidth part, the transmission direction indication information carrying information about a transmission direction of the bandwidth part;

the transmission-direction determination module 63 may include:

a second direction determination sub-module, configured to determine a transmission direction indicated in the transmission direction indication information about each of the at least one bandwidth part as a transmission direction of the bandwidth part.

Figure 9:
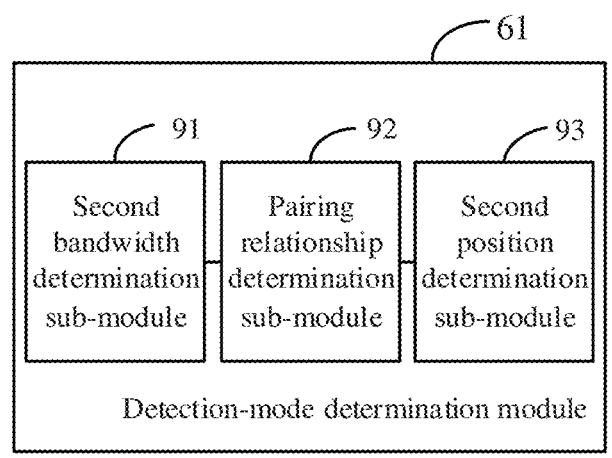
FIG. 9 is a block diagram of another device for indicating a transmission direction according to an exemplary embodiment.

FIG. 9 is a block diagram of another device for indicating a transmission direction according to an exemplary embodiment. The device for indicating a transmission direction may be applied to a terminal, and may be constructed on the basis of FIG. 6. The detection-mode determination module 61 may include:

a second bandwidth determination sub-module 91, configured to determine a bandwidth part to be detected as one or more designated bandwidth parts, each designated bandwidth part being one designated from all configured bandwidth parts;

a pairing relationship determination sub-module 92, configured to determine a pairing relationship corresponding to each designated bandwidth part, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part; and a third position determination sub-module 93, configured to determine a detection position corresponding to each designated bandwidth part.

Optionally, the device may further include:

a first reception module, configured to receive a third signaling notification sent by the base station through target signaling, the third signaling notification including the one or more designated bandwidth parts, and a pairing relationship corresponding to each designated bandwidth part.

Optionally, the third position determination sub-module 93 may include:

a third reception sub-module, configured to receive a fourth signaling notification sent by the base station through target signaling, the fourth signaling notification including configuration information transmitted by the transmission direction indication information about each designated bandwidth part; and a fourth position determination sub-module, configured to determine, according to the fourth signaling notification, a detection position corresponding to each designated bandwidth part.

Optionally, the detection module 62 may include:

a third detection sub-module, configured to detect transmission direction indication information about each designated bandwidth part, the transmission direction indication information about the designated bandwidth part carrying information about a transmission direction of one or more indicated bandwidth parts;

the transmission-direction determination module 63 may include:

a third direction determination sub-module, configured to determine, according to the pairing relationship, the transmission direction of one or more indicated bandwidth parts indicated in the transmission direction indication information about each designated bandwidth part as the transmission direction of each of the indicated bandwidth parts.

Figure 10:
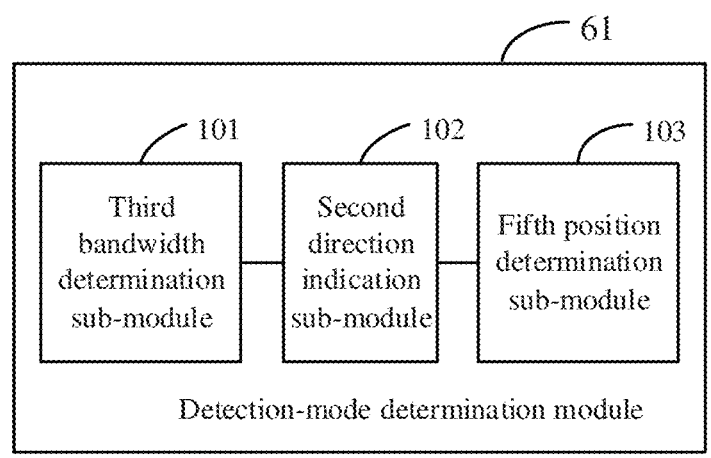
FIG. 10 is a block diagram of another device for indicating a transmission direction according to an exemplary embodiment.

FIG. 10 is a block diagram of another device for indicating a transmission direction according to an exemplary embodiment. The device for indicating a transmission direction may be applied to a terminal, and may be constructed on the basis of FIG. 6. The detection-mode determination module 61 may include:

a third bandwidth determination sub-module 101, configured to determine a bandwidth part to be detected as one or more designated bandwidth parts, each designated bandwidth part being one designated from all configured bandwidth parts;

a second direction indication sub-module 102, configured to determine a transmission direction indicated in the transmission direction indication information about each designated bandwidth part as a transmission direction of the bandwidth part; and a fifth position determination sub-module 103, configured to determine a detection position corresponding to each designated bandwidth part.

Optionally, the device may further include:

a second reception module, configured to receive a fifth signaling notification sent by the base station through target signaling, the fifth signaling notification including the one or more designated bandwidth parts.

Optionally, the fifth position determination sub-module 103 may include:

a fourth reception sub-module, configured to receive a sixth signaling notification sent by the base station through target signaling, the sixth signaling notification including configuration information transmitted by the transmission direction indication information about each designated bandwidth part; and a sixth position determination sub-module, configured to determine, according to the sixth signaling notification, a detection position corresponding to each designated bandwidth part.

Optionally, the detection module 62 may include:

a fourth detection sub-module, configured to detect transmission direction indication information about each designated bandwidth part, the transmission direction indication information carrying information about a transmission direction of the designated bandwidth part;

the transmission-direction determination module 63 may include:

a fourth direction determination sub-module, configured to determine a transmission direction indicated in the transmission direction indication information about each designated bandwidth part as a transmission direction of the designated bandwidth part; and a fifth direction determination sub-module, configured to obtain a transmission direction of any other bandwidth part that is not designated to be detected from the transmission direction of the designated bandwidth part according to a predefined rule, the predefined rule including a rule of determining a transmission direction of any other bandwidth part that is not designated to be detected according to the transmission direction of the designated bandwidth part. Optionally, in the above device embodiment, the target signaling may include at least one of the following:

RRC signaling, a MAC CE, and physical layer signaling.

Figure 11:
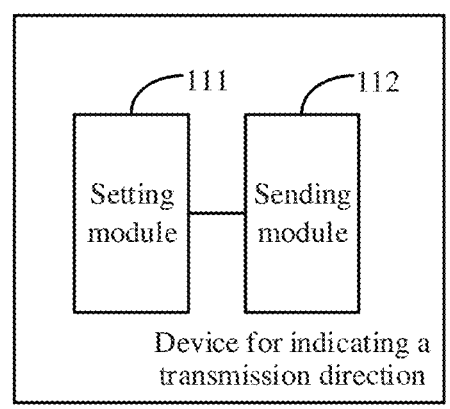
FIG. 11 is a block diagram of a device for indicating a transmission direction according to an exemplary embodiment.

FIG. 11 is a block diagram of another device for indicating a transmission direction according to an exemplary embodiment. The device for indicating a transmission direction may be applied to a base station and implement the method for indicating a transmission direction in FIG. 5. The base station configures at least one bandwidth part for a terminal. The device may include:

a setting module 111, configured to set a signaling notification for instructing the terminal to detect a transmission direction of each bandwidth part; and a sending module 112, configured to send the signaling notification to the terminal through target signaling, so as to determine, according to the signaling notification, a detection mode for detecting the transmission direction of each of the at least one bandwidth part.

Optionally, the signaling notification includes first information, and/or second information and/or third information. The first information may include information about one or more designated bandwidth parts, each designated bandwidth part being one designated from all configured bandwidth parts. The second information may include a pairing relationship corresponding to each designated bandwidth part, the pairing relationship being for representing a relationship between the designated bandwidth part and one or more indicated bandwidth parts, the indicated bandwidth part being the designated bandwidth part or any other bandwidth part that is not designated to be detected, information about the transmission direction of the indicated bandwidth part being carried in the transmission direction indication information about the designated bandwidth part. The third information may include configuration information transmitted by the transmission direction indication information about each designated bandwidth part.

Optionally, the signaling notification may include configuration information transmitted by transmission direction indication information about each of the at least one bandwidth part.

Optionally, the signaling notification may include a predefined rule, the predefined rule including a rule of determining a transmission direction of any other bandwidth part that is not designated to be detected according to the transmission direction of the designated bandwidth part.

The device embodiments substantially correspond to the method embodiments, and thus related parts refer to part of descriptions of the method embodiments. The device embodiments described above are only schematic, units described as separate parts therein may or may not be physically separated, and parts displayed as units may or may be not physical units, and namely may be located in the same place or may be distributed to multiple network units. Part or all of the modules therein may be selected according to a practical requirement to achieve the purpose of the solutions of the present disclosure. Those of ordinary skill e art may understand and implement without creative work.

Correspondingly, the present disclosure also provides a computer readable storage medium having a computer program stored thereon. The computer program can be used for implementing the method for indicating a transmission direction as shown in any one of FIG. 1A to FIG. 4.

Correspondingly, the present disclosure also provides a computer readable storage medium having a computer program stored thereon. The computer program can be used for performing the method for indicating a transmission direction as shown in FIG. 5.

Correspondingly, the present disclosure also provides a device for indicating a transmission direction. The device may be applied to a terminal. A base station may configure at least one bandwidth part for the terminal. The device may include:

a processor; and a memory configured to store an instruction executable for the processor, where the processor is configured to:

determine a detection mode for detecting a transmission direction of each of the at least one bandwidth part;

detect transmission direction indication information about a corresponding bandwidth part according to the detection mode; and determine the transmission direction of the corresponding bandwidth part according to the detected transmission direction indication information.

Figure 12:
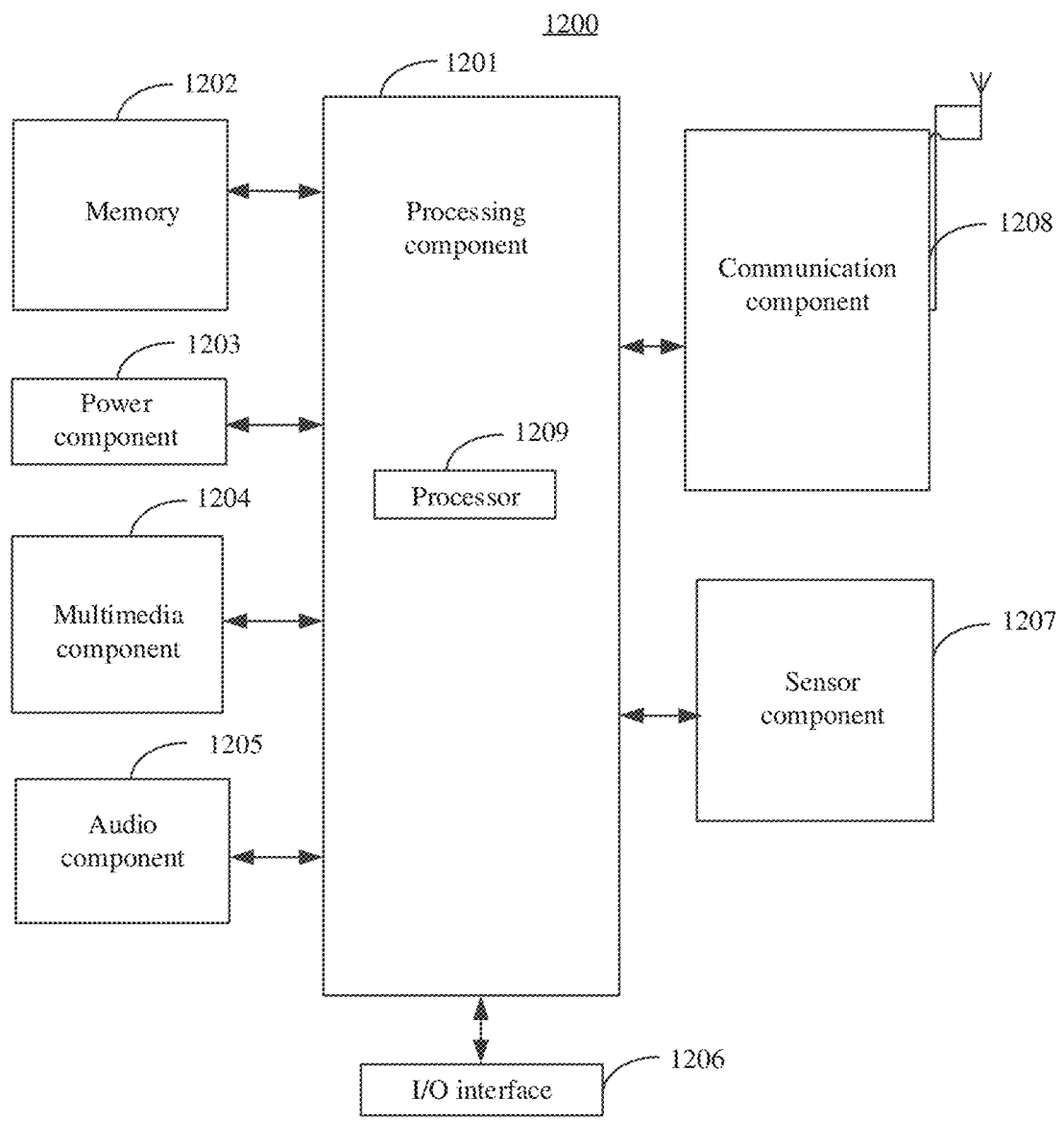
FIG. 12 is a schematic structural diagram of a device for indicating a transmission direction according to an exemplary embodiment.

FIG. 12 is a schematic structural diagram of a device for indicating a transmission direction according to an exemplary embodiment. FIG. 12 illustrates a device 1200 for indicating a transmission direction according to an exemplary embodiment. The device 1200 may be a terminal such as a computer, a mobile phone, a digital broadcast terminal, a messaging device, a gaming console, a tablet, a medical device, exercise equipment and a personal digital assistant.

Referring to FIG. 12, the device 1200 may include one or more of the following components: a processing component 1201, a memory 1202, a power component 1203, a multimedia component 1204, an audio component 1205, an input/output (I/O) interface 1206, a sensor component 1207, and a communication component 1208.

The processing component 1201 is typically configured to control overall operations of the device 1200, such as the operations associated with display, telephone calls, data communications, camera operations, and recording operations. The processing component 1201 may include one or more processors 1209 to execute instructions to perform all or part of the steps in the above described methods. Moreover, the processing component 1201 may include one or more modules which facilitate interaction between the processing component 1201 and other components. For instance, the processing component 1201 may include a multimedia module to facilitate interaction between the multimedia component 1204 and the processing component 1201.

The memory 1202 is configured to store various types of data to support the operation of the device 1200. Examples of such data may include instructions for any applications or methods operated on the device 1200, contact data, phonebook data, messages, pictures, video, etc. The memory 1202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1203 is configured to provide power to various components of the device 1200. The power component 1203 may include a power management system, one or more power supplies, and other components associated with generation, management and distribution of power for the device 1200.

The multimedia component 1204 may include a screen providing an output interface between the device 1200 and the user. In some embodiments, the screen may include a liquid crystal display (LCD) and a touch panel (TV). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1204 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1205 is configured to output and/or input audio signals. For example, the audio component 1205 includes a microphone (MIC) configured to receive an external audio signal when the device 1200 is in an operation mode, such as a call mode, a recording mode, and a voice recognition mode. The received audio signal may be further stored in the memory 1202 or transmitted via the communication component 1208. In some embodiments, the audio component 1205 may further include a speaker to output audio signals.

The I/O interface 1206 is configured to provide an interface between the processing component 1201 and peripheral interface modules, such as a keyboard, a click wheel, buttons, and the like. The buttons may include, but are not limited to, a home button, a volume button, a starting button, and a locking button.

The sensor component 1207 may include one or more sensors to provide status assessments of various aspects of the device 1200. For example, the sensor component 1207 may detect an on/off status of the device 1200 and relative positioning of components, such as a display and small keyboard of the device 1200, and the sensor component 1207 may further detect a change in a position of the device 1200 or a component of the device 1200, presence or absence of contact between the user and the device 1200, orientation or acceleration/deceleration of the device 1200 and a change in temperature of the device 1200. The sensor component 1207 may include a proximity sensor configured to detect presence of an object nearby without any physical contact. The sensor component 1207 may also include a light sensor, such as a Complementary Metal Oxide Semiconductor (CMOS) or Charge Coupled Device (CCD) image sensor, configured for use in an imaging application. In some embodiments, the sensor component 1207 may also include an acceleration sensor, a gyroscope sensor, a magnetic sensor, a pressure sensor or a temperature sensor.

The communication component 1208 is configured to facilitate communication, wired or wirelessly, between the device 1200 and other devices. The device 1200 may access a wireless network based on a communication standard, such as WiFi, 2G, or 3G, or a combination thereof. In one exemplary embodiment, the communication component 1208 may receive a broadcast signal or broadcast associated information from an external broadcast management system via a broadcast channel. In one exemplary embodiment, the communication component 1208 may further include a near field communication (NFC) module to facilitate short-range communications. For example, the NFC module may be implemented based on a Radio Frequency Identification (RFID) technology, an infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above method.

In exemplary embodiments, there is also provided a non-transitory computer readable storage medium including instructions, such as included in the memory 1202, executable by the processor 1209 in the device 1200, for performing the above method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The instruction in the storage medium may be executed by the processor to enable the device 1200 to perform any method for receiving a downlink control channel as described above.

Correspondingly, the present disclosure also provides a device for indicating a transmission direction. The device may be applied to a base station. The base station may configure at least one bandwidth part for a terminal. The device may include:

a processor; and a memory configured to store an instruction executable for the processor, where the processor is configured to:

set a signaling notification for instructing the terminal to detect a transmission direction of each bandwidth part; and send the signaling notification to the terminal through target signaling, so as to determine, according to the signaling notification, a detection mode for detecting the transmission direction of each of the at least one bandwidth part.

Figure 13:
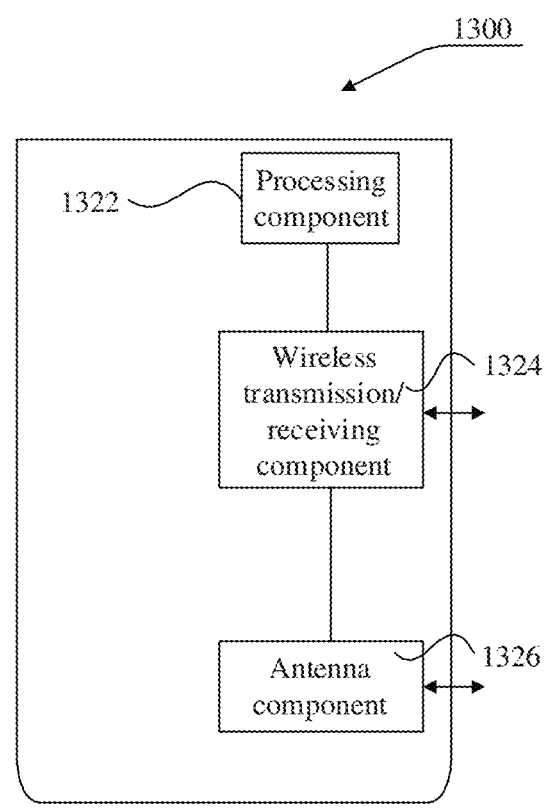
FIG. 13 is a schematic structural diagram of a device 1300 for indicating a transmission direction according to an exemplary embodiment.

As shown in FIG. 13, FIG. 13 is a schematic structural diagram of a device 1300 for indicating a transmission direction according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to perform any method for indicating a transmission direction as described above.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for determining a transmission direction, the method comprising:
   determining, by a terminal for which a base station configures a plurality of bandwidth parts, a detection mode for detecting a transmission direction of each of the plurality of bandwidth parts, wherein the determining comprises:
   determining, by the terminal, the plurality of bandwidth parts to be detected as all configured bandwidth parts;
   determining, by the terminal, a transmission direction indicated in transmission direction indication information about each of all the configured bandwidth parts as a transmission direction of a bandwidth part;
   receiving, by the terminal, a signaling notification from the base station, the signaling notification comprising configuration information transmitted by transmission direction indication information about each of all the configured bandwidth parts; and
   determining, by the terminal, a detection position corresponding to each of all the configured bandwidth parts according to the signaling notification; and
   determining, by the terminal, the transmission direction of the bandwidth part according to the transmission direction indication information.

2. The method according to claim 1, wherein the signaling notification is a second signaling notification, and the determining a detection mode for detecting a transmission direction of each of the plurality of bandwidth parts comprises:
   receiving, by the terminal, a first signaling notification from the base station, the first signaling notification instructing the terminal to detect the transmission direction of each of the plurality of bandwidth parts; and
   determining, by the terminal, the detection mode for detecting the transmission direction of each of the plurality of bandwidth parts according to the first signaling notification.

3. The method according to claim 2, wherein the first signaling notification comprises first information, second information and third information;
   the first information comprises information about one or more designated bandwidth parts, each of the one or more designated bandwidth parts being one designated from all configured bandwidth parts;
   the second information comprises a pairing relationship corresponding to each of the one or more designated bandwidth parts, wherein the pairing relationship represents a relationship between each of the one or more designated bandwidth parts and one or more indicated bandwidth parts, each of the indicated bandwidth parts is a designated bandwidth part or a bandwidth part that is not designated to be detected, information about the transmission direction of the indicated bandwidth parts is carried in the transmission direction indication information about the designated bandwidth part;
   the third information comprises configuration information transmitted by transmission direction indication information about each of the one or more designated bandwidth parts;
   determining the detection mode for detecting the transmission direction of each of the plurality of bandwidth parts according to the first signaling notification comprises:
   determining, according to the first information, a bandwidth part to be detected as one or more designated bandwidth parts;
   determining, according to the second information, the pairing relationship corresponding to each of the one or more designated bandwidth parts; and
   determining, according to the third information, a detection position corresponding to each of one or more designated bandwidth parts.

4. The method according to claim 3, further comprising:
   detecting the transmission direction indication information about each of the one or more designated bandwidth parts, wherein the transmission direction indication information about the designated bandwidth part carries information about a transmission direction of each of one or more indicated bandwidth parts;
   wherein the determining the transmission direction of the bandwidth part according to the transmission direction indication information comprises:
   determining, according to the pairing relationship, the transmission direction of the one or more indicated bandwidth parts indicated in the transmission direction indication information about each of the one or more designated bandwidth parts as the transmission direction of each of the one or more indicated bandwidth parts.

5. The method according to claim 1, further comprising:
   detecting the transmission direction indication information about each of all the configured bandwidth parts, wherein the transmission direction indication information carries information about the transmission direction of the bandwidth part;
   wherein the determining the transmission direction of the bandwidth part according to the transmission direction indication information comprises:
   determining the transmission direction indicated in the transmission direction indication information about each of all the configured bandwidth parts as the transmission direction of the bandwidth part.

6. A device for determining a transmission direction, the device being a terminal for which a base station configures a plurality of bandwidth parts, the device comprising:
   a processor; and
   a memory storing instructions executable by the processor,
   wherein the processor is configured to:
   determine a detection mode for detecting a transmission direction of each of the plurality of bandwidth parts, wherein determining the detection mode comprises:
   determining the plurality of bandwidth parts to be detected as all configured bandwidth parts;
   determining a transmission direction indicated in transmission direction indication information about each of all the configured bandwidth parts as a transmission direction of a bandwidth part;
   receiving a signaling notification from the base station, the signaling notification comprising configuration information transmitted by transmission direction indication information about each of all the configured bandwidth parts; and
   determining a detection position corresponding to each of all the configured bandwidth parts according to the signaling notification; and
   determine the transmission direction of the bandwidth part according to the transmission direction indication information.

7. The device according to claim 6, wherein the signaling notification is a second signaling notification, and the processor is further configured to:

receive a first signaling notification from the base station, the first signaling notification instructing the terminal to detect the transmission direction of each of the plurality of bandwidth parts; and determine the detection mode for detecting the transmission direction of each of the plurality of bandwidth parts according to the first signaling notification.

8. The device according to claim 6, wherein the processor is further configured to:

detect the transmission direction indication information about each of all the configured bandwidth parts, wherein the transmission direction indication information carries information about the transmission direction of the bandwidth part; and determine the transmission direction indicated in the transmission direction indication information about each of all the configured bandwidth parts as the transmission direction of the bandwidth part.

9. The device according to claim 6, wherein the processor is further configured to:

determine a bandwidth part to be detected as one or more designated bandwidth parts, each of the one or more designated bandwidth parts being one designated from all configured bandwidth parts;

determine a pairing relationship corresponding to each of the one or more designated bandwidth parts, wherein the pairing relationship represents a relationship between each of the one or more designated bandwidth parts and one or more indicated bandwidth parts, each of the indicated bandwidth parts is a designated bandwidth part or a bandwidth part that is not designated to be detected, information about the transmission direction of the indicated bandwidth part is carried in the transmission direction indication information about the designated bandwidth part; and determine a detection position corresponding to each of one or more designated bandwidth parts.

10. The device according to claim 9, wherein the processor is further configured to:

receive a third signaling notification from the base station, the third signaling notification comprising the one or more designated bandwidth parts and comprising the pairing relationship corresponding to each of the one or more designated bandwidth parts.

11. The device according to claim 9, wherein the processor is further configured to:

receive a fourth signaling notification sent by the base station through target signaling, the fourth signaling notification comprising configuration information transmitted by transmission direction indication information about each of the one or more designated bandwidth parts; and determine, according to the fourth signaling notification, the detection position corresponding to each of one or more designated bandwidth parts.

12. The device according to claim 9, wherein the processor is further configured to:

detect transmission direction indication information about each of the one or more designated bandwidth parts, wherein the transmission direction indication information about the designated bandwidth part carries information about a transmission direction of each of one or more indicated bandwidth parts; and determine, according to the pairing relationship, the transmission direction of the one or more indicated bandwidth parts indicated in the transmission direction indication information about each of the one or more designated bandwidth parts as the transmission direction of each of the one or more indicated bandwidth parts.

13. The device according to claim 6, wherein the processor is further configured to:

determine a bandwidth part to be detected as one or more designated bandwidth parts, each of the one or more designated bandwidth parts being one designated from all configured bandwidth parts;

determine a transmission direction indicated in the transmission direction indication information about each of the one or more designated bandwidth parts as a transmission direction of the bandwidth part; and determine a detection position corresponding to each of one or more designated bandwidth parts.

14. The device according to claim 13, wherein the processor is further configured to:

receive a fifth signaling notification sent by the base station through target signaling, the fifth signaling notification comprising the one or more designated bandwidth parts.

15. The device according to claim 13, wherein the processor is further configured to:

receive a sixth signaling notification sent by the base station through target signaling, the sixth signaling notification comprising configuration information transmitted by the transmission direction indication information about each of the one or more designated bandwidth parts; and determine, according to the sixth signaling notification, the detection position corresponding to each of one or more designated bandwidth parts.

16. The device according to claim 13, wherein the processor is further configured to:

detect the transmission direction indication information about each of the one or more designated bandwidth parts, wherein the transmission direction indication information carries information about a transmission direction of the designated bandwidth part;

determine a transmission direction indicated in the transmission direction indication information about each of the one or more designated bandwidth parts as a transmission direction of the designated bandwidth part; and obtain a transmission direction of any other bandwidth part that is not designated to be detected from the transmission direction of the designated bandwidth part according to a predefined rule, wherein the predefined rule comprises a rule of determining a transmission direction of any other bandwidth part that is not designated to be detected according to the transmission direction of the designated bandwidth part.

17. The device according to claim 16, wherein the processor is further configured to:

receive a sixth signaling notification sent by the base station through target signaling, the sixth signaling notification comprising the predefined rule.

18. A non-transitory computer readable storage medium having stored thereon instructions that, when executed by a processor of a terminal for which a base station configures a plurality of bandwidth parts, cause the terminal to perform:

determining a detection mode for detecting a transmission direction of each of the plurality of bandwidth parts, wherein the determining comprises:

determining the plurality of bandwidth parts to be detected as all configured bandwidth parts;

determining a transmission direction indicated in transmission direction indication information about each of all the configured bandwidth parts as a transmission direction of a bandwidth part;

receiving a signaling notification from the base station, the signaling notification comprising configuration information transmitted by transmission direction indication information about each of all the configured bandwidth parts; and determining a detection position corresponding to each of all the configured bandwidth parts according to the signaling notification; and determining the transmission direction of the bandwidth part according to the transmission direction indication information.

19. The non-transitory computer readable storage medium according to claim 18, wherein the signaling notification is a second signaling notification, and the determining a detection mode for detecting a transmission direction of each of the plurality of bandwidth parts comprises:

receiving a first signaling notification from the base station, the first signaling notification instructing the terminal to detect the transmission direction of each of the plurality of bandwidth parts; and determining the detection mode for detecting the transmission direction of each of the plurality of bandwidth parts according to the first signaling notification.

\* \* \* \* \*